(12) United States Patent
Kondo

(10) Patent No.: US 8,805,085 B2
(45) Date of Patent: Aug. 12, 2014

(54) IMAGE PROCESSING DEVICE AND METHOD

(75) Inventor: Kenji Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/386,849

(22) PCT Filed: Jul. 23, 2010

(86) PCT No.: PCT/JP2010/062398
§ 371 (c)(1),
(2), (4) Date: Jan. 24, 2012

(87) PCT Pub. No.: WO2011/013580
PCT Pub. Date: Feb. 3, 2011

(65) Prior Publication Data
US 2012/0121188 A1 May 17, 2012

(30) Foreign Application Priority Data

Jul. 31, 2009 (JP) ................. 2009-179395

(51) Int. Cl.
G06K 9/50 (2006.01)

(52) U.S. Cl.
USPC ........................................ 382/196

(58) Field of Classification Search
None
See application file for complete search history.

(56) References Cited

U.S. PATENT DOCUMENTS

2005/0008079 A1* 1/2005 Boon et al. ............... 375/240.27
2005/0053132 A1* 3/2005 Caball et al. ............. 375/240.11
2006/0269149 A1* 11/2006 Song ......................... 382/232
2009/0034626 A1 2/2009 Park et al.
2011/0026600 A1 2/2011 Kenji
2011/0026611 A1 2/2011 Kenji

FOREIGN PATENT DOCUMENTS

| CN | 1578467 A | | 2/2005 | |
|---|---|---|---|---|
| JP | 2002 150281 | | 5/2002 | |
| JP | 2002150281 A | * | 5/2002 | ............... G06T 3/40 |
| JP | 2005 033336 | | 2/2005 | |
| JP | 2007 235886 | | 9/2007 | |
| JP | 2007235886 A | * | 9/2007 | |
| JP | 2008-205534 A | | 9/2008 | |
| WO | 2008 060127 | | 5/2008 | |

OTHER PUBLICATIONS

Block-based Adaptive Loop Filter to Chujoh et al. ITU. Jul. 2008.*
International Search Report issued on Aug. 17, 2010 in PCT/JP10/062398 filed on Jul. 23, 2010.
Japanese Office Action Issued Mar. 14, 2013 in Patent Application No. 2009-179395.
U.S. Appl. No. 14/032,766, filed Sep. 20, 2013, Kondo.
Office Action issued Dec. 20, 2012 in Japanese Patent Application No. 2009-179395.
Chinese Office Action issued Jan. 30, 2014 in Chinese Patent Application No. 201080042415.5 (with English Translation).

* cited by examiner

Primary Examiner — Stephen R Koziol
Assistant Examiner — Delomia Gilliard
(74) Attorney, Agent, or Firm — Oblon, Spivak, McClelland, Maier & Neustadt, L.L.P.

(57) ABSTRACT

The present invention relates to an image processing device and method whereby deterioration of effects of filter processing due to local control of filter processing when encoding or decoding can be suppressed. A boundary control flag generating unit 132 of a control information generating unit 112 generates boundary control flags based on system specification information which a system specification managing unit 141 manages. A control unit 171 of an adaptive filter processing unit 113 determines a processing method for filter processing to be performed as to pixels nearby a slice boundary following the value of the boundary control flag. For example, selection is made to perform filter processing straddling slices or to perform filter processing closed at the present slice. The present invention can be applied to an image processing device, for example.

13 Claims, 26 Drawing Sheets

IMAGE PROCESSING DEVICE AND METHOD

TECHNICAL FIELD

The present invention relates to an image processing device and method, and specifically relates to an image processing device and method which enable suppression in deterioration of the effects of filter processing due to local control of filter processing when encoding or when decoding.

BACKGROUND ART

In recent years, there have come into widespread use devices, compliant to formats such as MPEG (Moving Picture Experts Group) or the like, which handle image information as digital signals, and take advantage of redundancy peculiar to the image information in order to perform highly effective information transmission and storage at that time, to compress the image by orthogonal transform such as discrete cosine transform or the like and motion compensation, as both information distribution such as broadcasting and information reception in general households.

In particular, MPEG2 (ISO (International Organization for Standardization)/IEC (International Electrotechnical Commission) 13818-2) is defined as a general-purpose image encoding format, and is a standard encompassing both of interlaced scanning images and sequential-scanning images, and standard resolution images and high definition images. For example, MPEG2 has widely been employed now by broad range of applications for professional usage and for consumer usage. By employing the MPEG2 compression format, a code amount (bit rate) of 4 through 8 Mbps is allocated in the event of an interlaced scanning image of standard resolution having 720×480 pixels, for example. Also, by employing the MPEG2 compression format, a code amount (bit rate) of 18 through 22 Mbps is allocated in the event of an interlaced scanning image of high resolution having 1920×1088 pixels, for example, whereby a high compression rate and excellent image quality can be realized.

With MPEG2, high image quality encoding adapted to broadcasting usage is principally taken as an object, but a lower code amount (bit rate) than the code amount of MPEG1, i.e., an encoding format having a higher compression rate is not handled. According to spread of personal digital assistants, it has been expected that needs for such an encoding format will be increased from now on, and in response to this, standardization of the MPEG4 encoding format has been performed. With regard to an image encoding format, the specification thereof was confirmed as international standard as ISO/IEC 14496-2 in December in 1998.

Further, in recent years, standardization of a standard called H.26L (ITU-T (ITU Telecommunication Standardization Sector) Q6/16 VCEG (Video Coding Experts Group)) has progressed, originally intended for image encoding for videoconferencing usage. With H.26L, it has been known that as compared to a conventional encoding format such as MPEG2 or MPEG4, though greater computation amount is requested for encoding and decoding thereof, higher encoding efficiency is realized. Also, currently, as part of activity of MPEG4, standardization for also taking advantage of functions not supported by H.26L with this H.26L taken as a base, to realize higher encoding efficiency, has been performed as Joint Model of Enhanced-Compression Video Coding. As a schedule of standardization, H.264 and MPEG-4 Part 10 (AVC (Advanced Video Coding)) become an international standard in March, 2003.

Also, there is adaptive loop filter (ALF (Adaptive Loop Filter)) as a next generation video encoding technique which is being considered as of recent (see NPL 1 for example). According to this adaptive loop filter, optimal filter processing is performed each frame, and block noise which was not completely removed at the deblocking filter, and noise due to quantization, can be reduced.

However, images generally have various features, so optimal filter coefficients are locally different. With the method in NPL 1, the same filter coefficient is applied to all pixels within one frame, so the image quality of the overall frame improves, but there has been the concern that there may be local deterioration.

Accordingly, there has been conceived not performing filter processing in regions which locally deteriorate (see NPL 2 and NPL 3, for example). In this case, the image encoding device corresponds multiple control blocks arrayed without gaps as if they were being used for paving, with regions of the image, and controls whether or not to perform filter processing on the image for each control block. The image encoding device sets flag information for each block, and performs adaptive filter processing according to the flag information. In the same way, the image decoding device also performs adaptive filter processing according to the flag information.

CITATION LIST

Non Patent Literature

NPL 1: Yi-Jen Chiu and L. Xu, "Adaptive (Wiener) Filter for Video Compression," ITU-T SG16 Contribution, C437, Geneva, April 2008.

NPL 2: Takeshi. Chujoh, et al., "Block-based Adaptive Loop Filter" ITU-T SG16 Q6 VCEG Contribution, AI18, Germany, July, 2008

NPL 3: T. Chujoh, N. Wada and G. Yasuda, "Quadtree-based Adaptive Loop Filter," ITU-T SG16 Q6 VCEG Contribution, VCEG-AK22(r1), Japan, April, 2009

SUMMARY OF INVENTION

Technical Problem

However, there is a method in which one frame is divided into multiple slices, and encoding processing and decoding processing of the image is performed for each such slice (multi-slice). NPL 2 and NPL 3 make no mention regarding processing of pixels near boundaries of slices in such a multi-slice case, and how this should be processed has been unclear.

The present invention has been proposed in light of this situation, and it is an object thereof to suppress deterioration of the effects of filter processing due to local control of filter processing when encoding or when decoding.

Solution to Problem

One aspect of the present invention is an image processing device including: determining means configured to determine whether or not there are included, in surrounding pixels of a pixel to be processed by filter processing locally performed on an image, pixels of a slice neighboring a slice in which the pixel to be processed is included; selecting means configured to select, from a plurality of methods, a method for the filter processing to be performed on the pixel to be processed, based on a boundary control flag, in the event that determination has been made by the determining means that a pixel of the neighboring slice is included in the surrounding pixels;

and filter processing means configured to perform the filter processing as to the pixel to be processed with the method selected by the selecting means.

The selecting means may select one of a method to perform the filter processing on the pixel to be processed after the surrounding pixels situated in the neighboring slice have been obtained, and a method to perform the filter processing on the pixel to be processed by generating dummy data of the surrounding pixels situated in the neighboring slice by duplicating the surrounding pixels situated in the slice including the pixel to be processed.

The selecting means may select one of a method to perform the filter processing on the pixel to be processed after the surrounding pixels situated in the neighboring slice have been obtained, and a method to omit performing the filter processing on the pixel to be processed.

The image processing device may further include: generating means configured to generate the boundary control flag based on system specifications; with the selecting means selecting a method of the filter processing as to the pixel to be processed, based on the boundary control flag generated by the generating means.

The system specifications may include hardware resources of the image processing device.

The system specifications may include the usage purpose of the image processing device.

The image processing device may further include: encoding means configured to encode the image and generate encoded data; with the encoding means further encoding the boundary control flag generated by the generating means, and adding to the encoded data.

The image processing device may further include: decoding means configured to decode encoded data of the image having been encoded, and generate the image; with the decoding means further decoding the encoded boundary control flag which has been added to the encoded data; and the selecting means selecting a method for the filter processing as to the pixel to be processed, based on the boundary control flag decoded by the decoding means.

One aspect of the present invention also is an image processing method wherein determining means of an image processing device determine whether or not there are included, in surrounding pixels of a pixel to be processed by filter processing locally performed on an image, pixels of a slice neighboring a slice in which the pixel to be processed is included, selecting means of the image processing device select, from a plurality of methods, a method for the filter processing to be performed on the pixel to be processed, based on a boundary control flag, in the event that determination has been made that a pixel of the neighboring slice is included in the surrounding pixels, and filter processing means of the image processing device perform the filter processing as to the pixel to be processed with the method that has been selected.

With an aspect of the present invention, determination is made regarding whether or not there are included, in surrounding pixels of a pixel to be processed by filter processing locally performed on an image, pixels of a slice neighboring a slice in which the pixel to be processed is included, a method for the filter processing to be performed on the pixel to be processed is selected from a plurality of methods, based on a boundary control flag, in the event that determination has been made that a pixel of the neighboring slice is included in the surrounding pixels, and the filter processing is performed as to the pixel to be processed with the method that has been selected.

Advantageous Effects of Invention

According to the present invention, an image can be encoded or decoded. Particularly, deterioration of effects of filter processing due to local control of filter processing when encoding or decoding can be suppressed. For example, the deterioration in the effects of filter processing can be suppressed even in case of performing encoding or decoding with each frame of an image divided into a plurality.

DESCRIPTION OF EMBODIMENTS

Hereinafter, embodiments of the present invention will be described. Note that description will proceed in the following order.
1. First Embodiment (image encoding device)
2. Second Embodiment (image decoding device)
3. Third Embodiment (image encoding/decoding system)
4. Fourth Embodiment (QALF)
5. Fifth Embodiment (personal computer)
6. Sixth Embodiment (television receiver)
7. Seventh Embodiment (cellular telephone)
8. Eighth Embodiment (hard disk recorder)
9. Ninth Embodiment (camera)

1. First Embodiment

Configuration of Device

Figure 1:
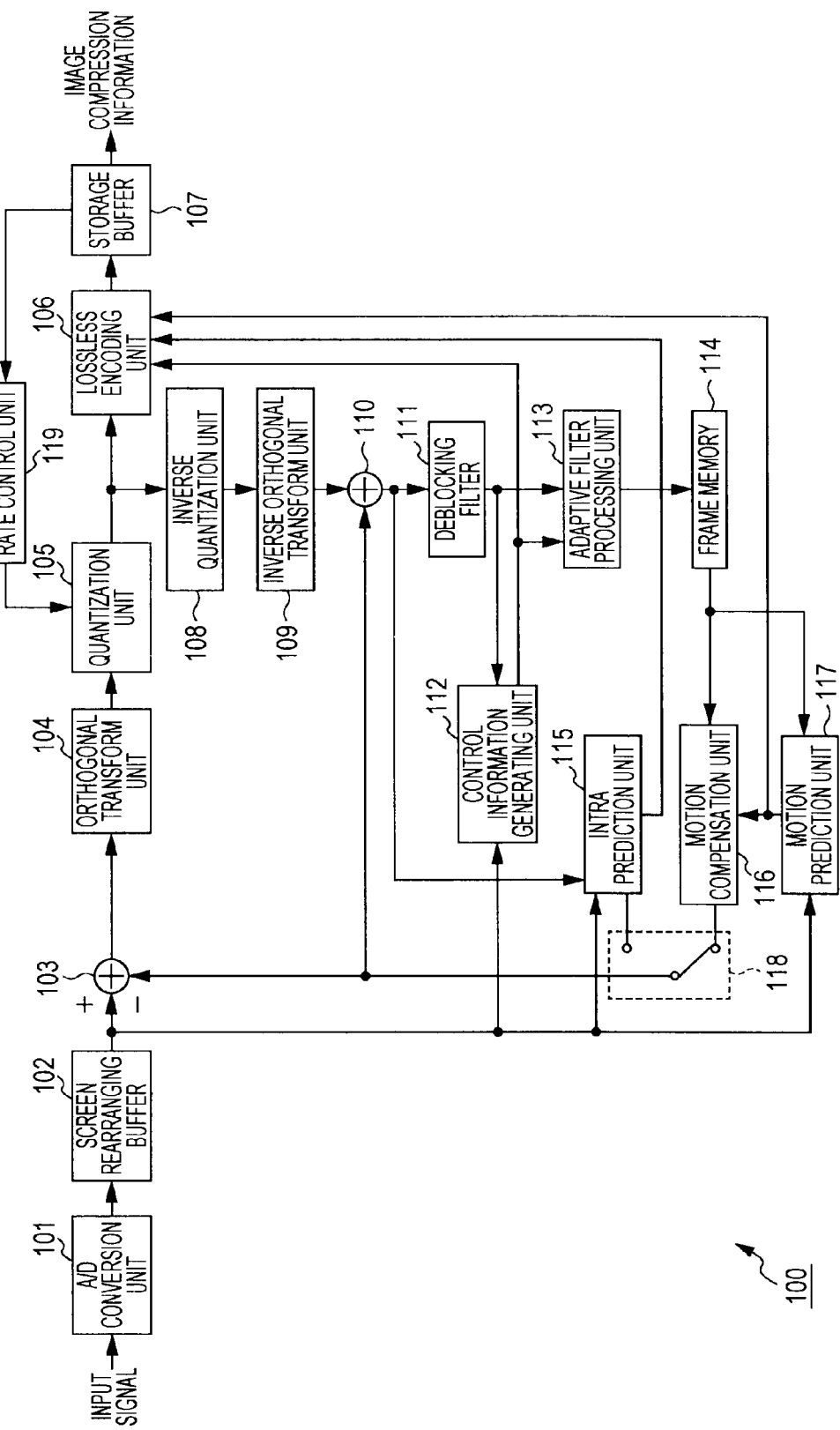
FIG. 1 is a block diagram illustrating the configuration of an embodiment of an image encoding device to which the present invention has been applied.

FIG. 1 represents the configuration of an embodiment of an image encoding device serving as an image processing device to which the present invention has been applied.

An image encoding device 100 shown in FIG. 1 is an image encoding device which subjects an image to compression encoding using, for example, the H.264 and MPEG-4 Part10 (Advanced Video Coding) (hereafter, written as H.264/AVC) format, and further employs an adaptive loop filter.

With the example in FIG. 1, the image encoding device 100 has an A/D (Analog/Digital) conversion unit 101, a screen rearranging buffer 102, a computing unit 103, an orthogonal transform unit 104, a quantization unit 105, a lossless encoding unit 106, and a storing buffer 107. The image encoding device 100 also has an inverse quantization unit 108, an inverse orthogonal transform unit 109, a computing unit 110, and a deblocking filter 111. Further, the image encoding device 100 has a control information generating unit 112, an adaptive filter processing unit 113, and frame memory 114. Also, the image encoding device 100 has an intra prediction unit 115, a motion compensation unit 116, a motion prediction unit 117, and a prediction image selecting unit 118. Further, the image encoding device 100 has a rate control unit 119.

The A/D conversion unit 101 performs A/D conversion of an input image, and outputs to the screen rearranging buffer 102 and stores. The screen rearranging buffer 102 rearranges the images of frames in the stored order for display into the order of frames for encoding according to GOP (Group of Picture). The computing unit 103 subtracts from the image read out from the screen rearranging buffer 102 the prediction image from the intra prediction unit 115 selected by the prediction image selecting unit 118 or the prediction image from the motion compensation unit 116, and outputs difference information thereof to the orthogonal transform unit 104. The orthogonal transform unit 104 subjects the difference information from the computing unit 103 to orthogonal transform, such as discrete cosine transform, Karhunen-Loéve transform, or the like, and outputs a transform coefficient thereof. The quantization unit 105 quantizes the transform coefficient that the orthogonal transform unit 104 outputs.

The quantized transform coefficient that is the output of the quantization unit 105 is input to the lossless encoding unit 106, where it is subjected to lossless encoding, such as variable length coding, arithmetic coding, or the like, and compressed.

The lossless encoding unit 106 obtains information indicating intra prediction and so forth from the intra prediction unit 115, and obtains information indicating an inter prediction mode, and so forth from the motion prediction unit 117. Note that the information indicating intra prediction will also be referred to as intra prediction mode information hereinafter. Also, the information indicating inter prediction will also be referred to as inter prediction mode information hereinafter.

The lossless encoding unit 106 obtains control information of adaptive filter processing performed at the adaptive filter processing unit 113 from the control information generating unit 112.

The lossless encoding unit 106 encodes the quantized transform coefficient, and also encodes the control information of adaptive filter processing, the information indicating intra prediction, the information indicating an inter prediction mode, quantization parameters, and so forth, and takes these as part of header information in the compressed image (multiplexes). The lossless encoding unit 106 supplies the encoded data to the storing buffer 107 for storage.

For example, with the lossless encoding unit 106, lossless encoding processing, such as variable length coding, arithmetic coding, or the like, is performed. Examples of the variable length coding include CAVLC (Context-Adaptive Variable Length Coding) determined by the H.264/AVC format. Examples of the arithmetic coding include CABAC (Context-Adaptive Binary Arithmetic Coding).

The storing buffer 107 temporarily holds the data supplied from the lossless encoding unit 106, and at a predetermined timing outputs this to, for example, a storage device or transmission path or the like downstream not shown in the drawing, as a compressed image encoded by the H.264/AVC format.

Also, the quantized transform coefficient output from the quantization unit 105 is also input to the inverse quantization unit 108. The inverse quantization unit 108 performs inverse quantization of the quantized transform coefficient with a method corresponding to quantization at the quantization unit 105, and supplies the obtained transform coefficient to the inverse orthogonal transform unit 109.

The inverse orthogonal transform unit 109 performs inverse orthogonal transform of the supplied transform coefficients with a method corresponding to the orthogonal transform processing by the orthogonal transform unit 104. The output subjected to inverse orthogonal transform is supplied to the computing unit 110. The computing unit 110 adds the prediction image supplied from the prediction image selecting unit 118 to the inverse orthogonal transform result supplied from the inverse orthogonal transform unit 109, i.e., the restored difference information, and obtains a locally decoded image (decoded image). The addition results thereof are supplied to the deblocking filter 111.

The deblocking filter 111 removes block noise from the decoded image. The deblocking filter 111 then supplies the noise removal results to the control information generating unit 112 and the adaptive filter processing unit 113.

The control information generating unit 112 obtains the decoded image supplied from the deblocking filter 111 and the current input image read out from the screen rearranging buffer 102, and generates from these control information for adaptive filtering to be performed at the adaptive filter processing unit 113. While details will be described later, the control information includes filter coefficients, block size, filter block flags, and boundary control flags and the like.

The control information generating unit 112 supplies the generated control information to the adaptive filter processing unit 113. The control information generating unit 112 also supplies the generated control information to the lossless encoding unit 106 as well. As described above, the control information is subjected to lossless compression processing by the lossless encoding unit 106, and included in the image compressed information (multiplexed). That is to say, the control information is sent to the image decoding device along with the image compression information.

The adaptive filter processing unit 113 performs filter processing on the decoded image supplied form the deblocking filter 111, using the filter coefficients, block size specification, and filter block flags and the like, of the control information supplied from the control information generating unit 112. A Wiener filter (Wiener Filter), for example, is used as this filter. Of course, a filer other than a Wiener filter may be used. The adaptive filter processing unit 113 supplies the filter processing results to the frame memory 114, and stores as a reference image.

The frame memory 114 outputs the stored reference image to the motion compensation unit 116 and motion prediction unit 117 at a predetermined timing.

With this image encoding device 100, the I picture, B picture, and P picture from the screen rearranging buffer 102 are supplied to the intra prediction unit 115 as an image to be subjected to intra prediction (also referred to as intra processing), for example. Also, the B picture and P picture read out from the screen rearranging buffer 102 are supplied to the motion compensation unit 117 as an image to be subjected to inter prediction (also referred to as inter processing).

The intra prediction unit 115 performs intra prediction processing of all of the candidate intra prediction modes based on the image to be subjected to intra prediction read out from the screen rearranging buffer 102, and the reference image supplied from the frame memory 114 to generate a prediction image.

With the intra prediction unit 115, information relating to the intra prediction mode applied to the current block/macroblock is transmitted to the lossless encoding unit 106, and is encoded as a part of the header information in the image compression information. With the H.264 image information encoding format, the intra 4×4 prediction mode, intra 8×8 prediction mode, and intra 16×16 prediction mode are defined for luminance signals, and also with regard to color difference signals, a prediction mode can be defined for each macroblock, independent from the luminance signals. For the intra 4×4 prediction mode, one intra prediction mode is defined for each 4×4 luminance block. For the intra 8×8 prediction mode, one intra prediction mode is defined for each 8×8 luminance block. For the intra 16×16 prediction mode and color difference signals, one intra prediction mode is defined for each macroblock.

The intra prediction unit 115 calculates a cost function value as to the intra prediction mode where the prediction image has been generated, and selects the intra prediction mode where the calculated cost function value gives the minimum value, as the optimal intra prediction mode. The intra prediction unit 115 supplies the prediction image generated in the optimal intra prediction mode to the prediction image selecting unit 118.

With regard to the image to be subjected to inter encoding, the motion prediction unit 117 obtains image information supplied from the screen rearranging buffer 102 (input image) and image information serving as the reference frame supplied from the frame memory 114 (decoded image), and calculates a motion vector. The motion prediction unit 117 supplies motion vector information indicating the calculated motion vector to the lossless encoding unit 106. This motion vector information is subjected to lossless compression processing by the lossless encoding unit 106, and included in the image compressing information. That is to say the motion vector information is sent to the image decoding device along with the image compression information.

Also, the motion prediction unit 117 also supplies the motion vector information to the motion compensation unit 116.

The motion compensation unit 116 performs motion compensation processing in accordance with the motion vector information supplied from the motion prediction unit 117, and generates inter prediction image information. The motion compensation unit 116 supplies the generated prediction image information to the prediction image selecting unit 118.

In the case of an image for performing intra encoding, the prediction image selecting unit 118 supplies the output of the intra prediction unit 115 to the computing unit 103, and in the event of an image for performing inter encoding, supplies the output of the motion compensation unit 116 to the computing unit 103.

The rate control unit 119 controls the rate of quantization operations of the quantization unit 105 based on the compressed image stored in the storing buffer 107, such that overflow or underflow does not occur.

With MPEG (Moving Picture Experts Group) 2, the increments of motion prediction/compensation processing is motion compensation blocks, and independent motion vector information can be held at each motion compensation block. The size of a motion compensation block is 16×16 pixels in the case of frame motion compensation mode, and in the case of field motion compensation mode is 16×8 pixels for each of the first field and the second field.

Figure 2:
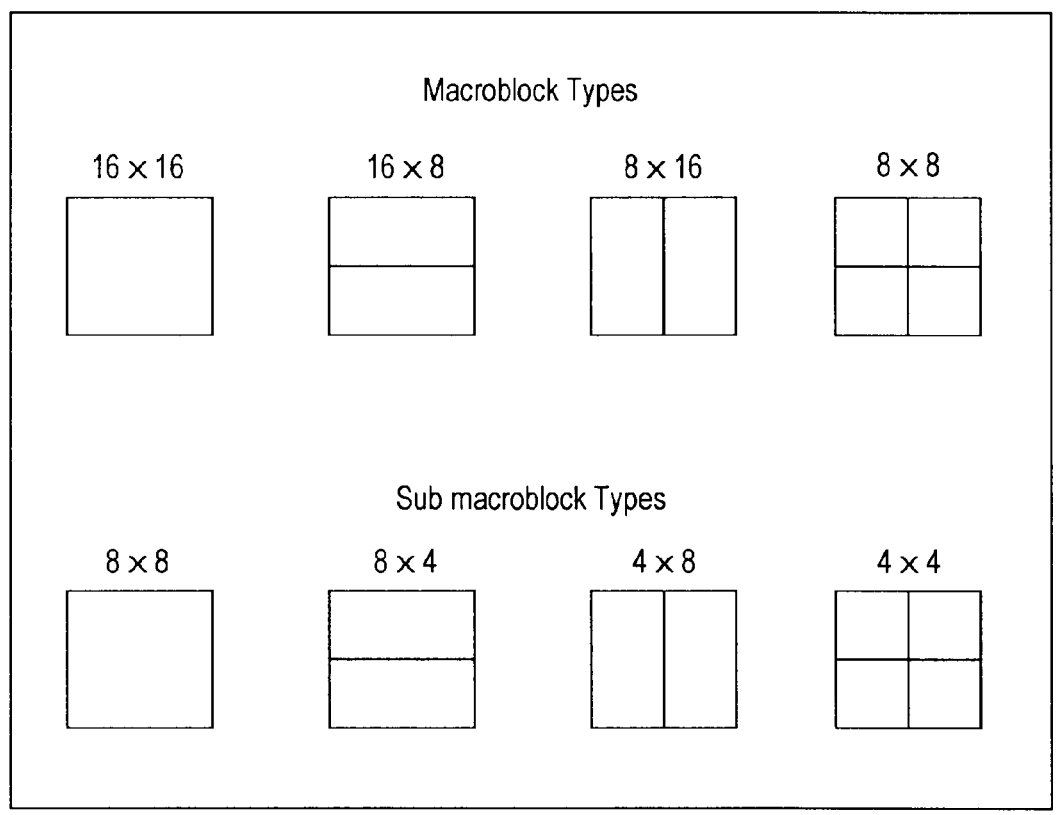
FIG. 2 is a diagram describing variable block size motion prediction/compensation processing.

On the other hand, with AVC (Advanced Video Coding), one macroblock configured of 16×16 pixels, as shown at the upper side in FIG. 2, can be divided into any of the partitions of 16×16, 16×8, 8×16, or 8×8, with each holding independent motion vector information. Also, as shown at the lower side in FIG. 2, a 8×8 partition can be divided into any of the sub partitions of 8×8, 8×4, 4×8, or 4×4, with each holding independent motion vector information. Motion prediction/compensation processing is performed with this motion compensation block as an increment.

Figure 3:
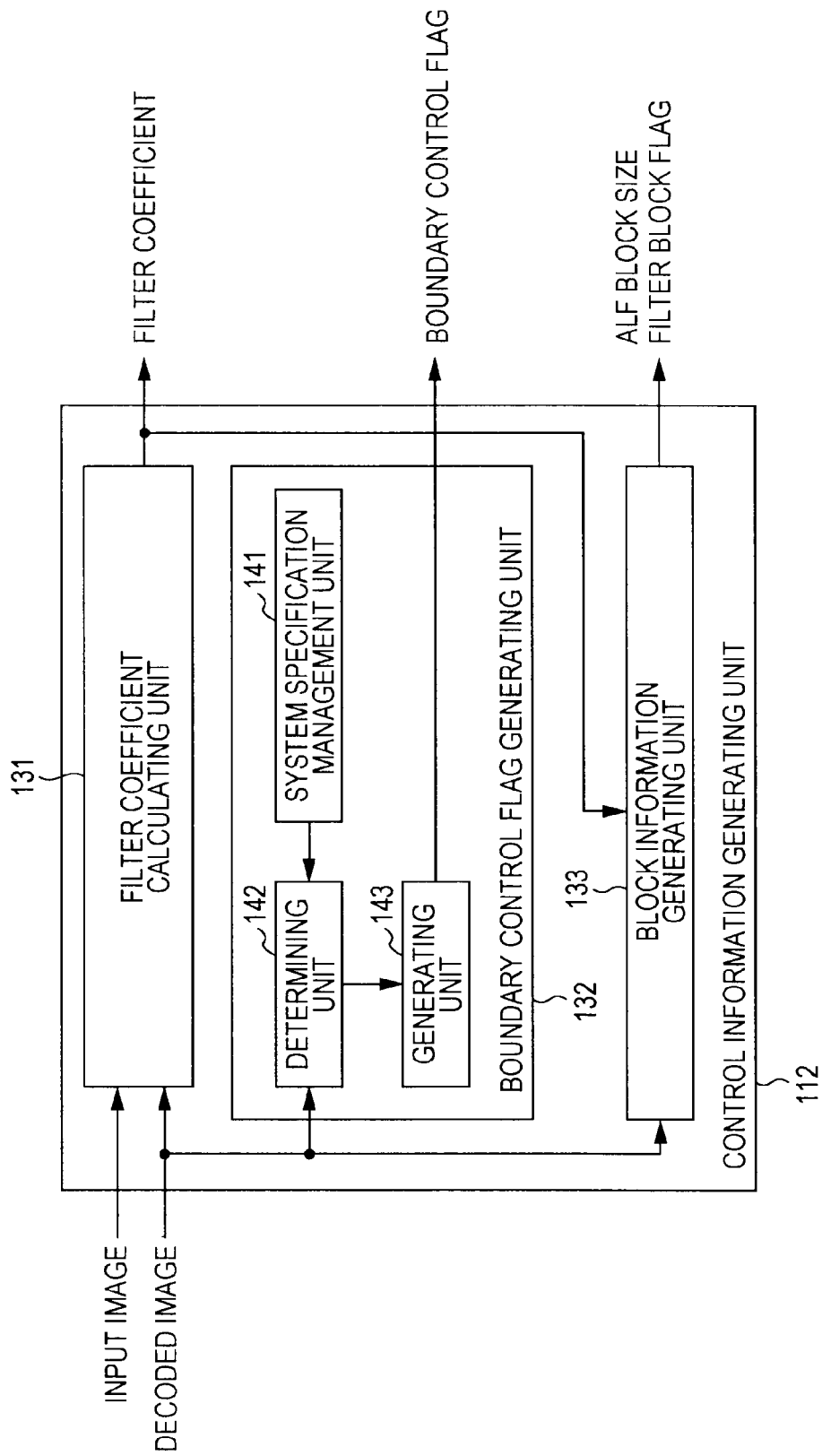
FIG. 3 is a block diagram illustrating a primary configuration example of a control information generating unit.

FIG. 3 is a block diagram illustrating a primary configuration example of the control information generating unit 112.

The control information generating unit 112 generates control information used at the adaptive filter (ALF (Adaptive Loop Filter)) which is a loop filter, performed at the adaptive filter processing unit 113. The control information generating unit 112 generates, as the control information, filter coefficients, ALF block size, filter block flags, and boundary control flags, for example.

The control information generating unit 112 has a filter coefficient calculating unit 131, boundary control flag generating unit 132, and block information generating unit 133.

The filter coefficient calculating unit 131 obtains the decoded image supplied from the deblocking filter 111 and current input image read out from the screen rearranging buffer 102, and calculates an ALF filter coefficient for each frame.

The boundary control flag generating unit 132 generates a boundary control flag (alf_enable_in_slice_boundary) which controls how filter processing is to be performed as to pixels near the boundary of slices, of which a plurality is formed in the frame (specifies filter processing method). Details will be described later.

The block information generating unit 133 determines the ALF block size based on the decoded image supplied from the deblocking filter 111 and the filter coefficients calculated by the filter coefficient calculating unit 131, and generates a filter block flag for each ALF block within the slice to be processed.

Figure 4:
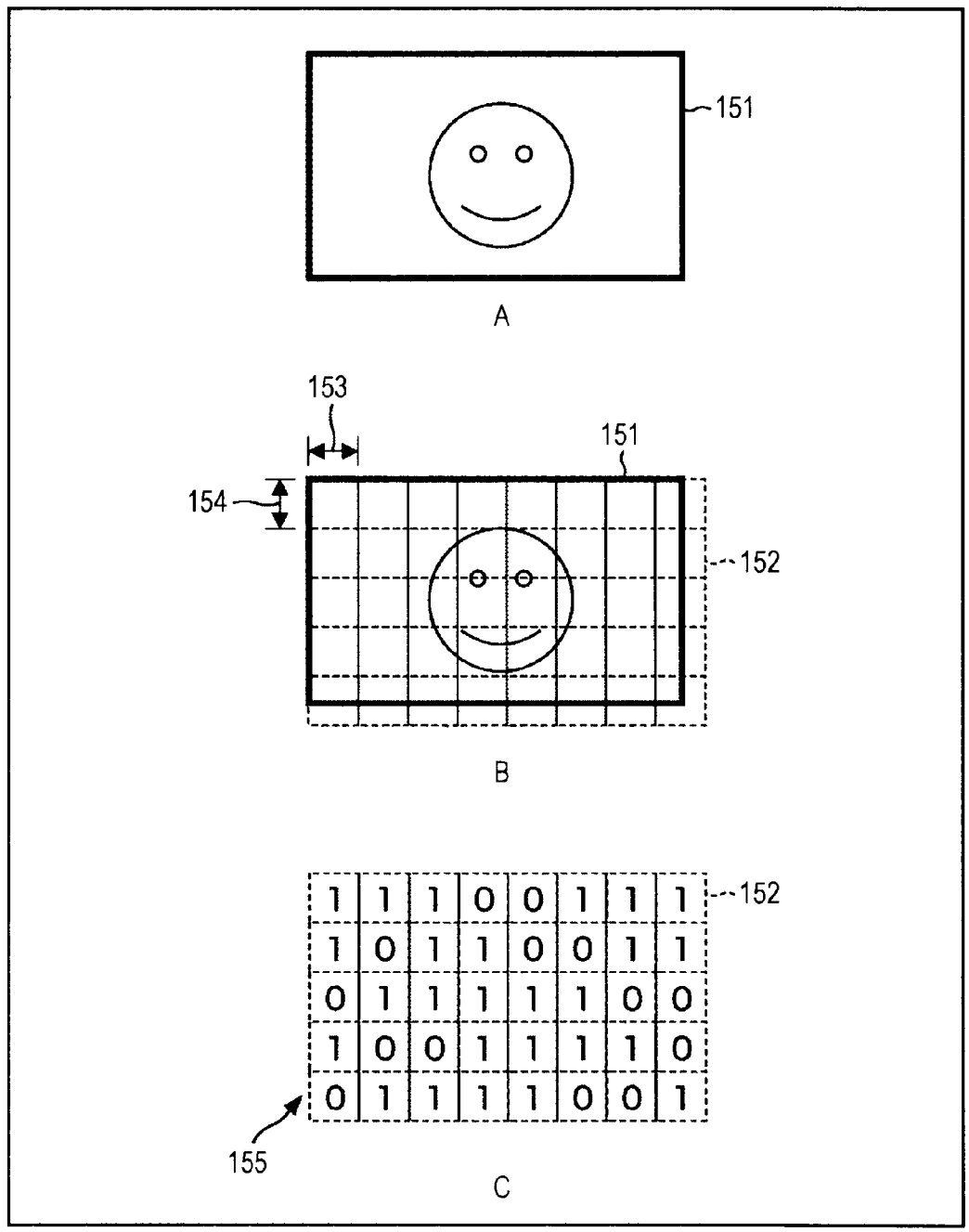
FIG. 4 is a diagram describing ALF blocks and filter block flags.

Now, description will be made regarding the ALF block and filter block flag. FIG. 4 is a diagram for describing ALF blocks and filter block flags.

As described above, the adaptive filter has filter coefficients set for each frame. That is to say, optimal filter processing is performed in increments of frames. However, generally, frame images are not uniform overall, and have various features locally. Therefore, optimal filter coefficients differ locally. Accordingly, while the filter processing using filter coefficients determined each frame as described above improve the image quality for the overall frame, there has been concern that this will in fact deteriorate locally.

Accordingly, BALF (Block based Adaptive Loop Filter) in which filter processing is not performed at regions where image quality locally deteriorates, has been conceived.

A decoded image following deblocking filter processing is shown in frame 151 in A in FIG. 4. As shown in B in FIG. 4, the block information generating unit 133 arrays multiple ALF blocks 152, which are control blocks serving as the increment of control for adaptive filter processing locally performed, without gaps as if they were being used for paving the entire region of the frame 151. The region where the ALF blocks 152 are placed does not have to be the same as the region of the frame 151, but includes at least the entire region of the frame. The region of the frame 151 is resultantly divided into the regions of the ALF blocks 152 (multiple regions).

The block information generating unit 133 determines the horizontal direction size (both-sided arrow 153) and vertical direction size (both-sided arrow 154) of the ALF blocks 152. For the size of the ALF blocks, one of 8×8, 16×16, 24×24, 32×32, 48×48, 64×64, 96×96, or 128×128, can be specified for each slice. The information specifying the size of the ALF block will be called block size index.

Once the block size is decided, the number of ALF blocks per frame has also been decided, since the frame size is fixed.

As shown in C in FIG. 4, the block information generating unit 133 sets a filter block flag 155 which controls whether or not to perform filter processing, in each Alf block 152. For example, a filter block flag 155 with a value of "1" is generated for a region where the image quality is improved by the adaptive filter, and a filter block flag 155 with a value of "0" is generated for a region where the image quality is deteriorated by the adaptive filter. With the filter block flag 155, the value of "1" is a value indicating that filter processing is to be performed, and the value of "0" is a value indicating that filter processing is not to be performed.

The adaptive filter processing unit 113 controls the adaptive filter processing based on the value of the filter block flag 155. For example, the adaptive filter processing unit 113 performs filter processing only at the regions where the ALF blocks 152 have a value of "1" for the filter flag 155, and does not perform filter processing at the regions where the ALF blocks 152 have a value of "0" for the filter flag 155.

Also, the above-described block size index and filter block flag are included in the slice header of the image compression information, and sent from the image encoding device 100 to the image decoding device. The one or more filter block flags corresponding to the number of ALF blocks are included in the slice header in the order of raster scan, for example.

Accordingly, the smaller the size of the ALF block, the finer filter control can be realized, and more appropriate ALF filtering can be performed. However, smaller ALF block size increases the bit amount of the filter block flags. That is to say, the smaller the ALF block size is the more the encoding efficiency of the image compression information decreases. Thus, the capabilities of the adaptive filter and the encoding efficiency of the image compression information are in a tradeoff relation.

The number of ALF blocks is calculated as with the following Expression (1).

[Mathematic Expression 1]

$$N_{ALFBLOCK} = \text{floor}\left[\frac{16 \times N_{MBw} + N_{SIZE} - 1}{N_{SIZE}}\right] \times \text{floor}\left[\frac{16 \times N_{MBh} + N_{SIZE} - 1}{N_{SIZE}}\right] \quad (1)$$

In Expression (1), $N_{ALFBLOCK}$ represents the number of ALF blocks. Also, $N_{MBw}$ represents the number of macro blocks in the horizontal direction of the picture, and $N_{MBh}$ represents the number of macro blocks in the vertical direction of the picture. Further, $N_{SIZE}$ represents the size of one side of an ALF block. Also, floor[x] is a function where x is rounded off to the decimal so as to be an integer.

Figure 5:
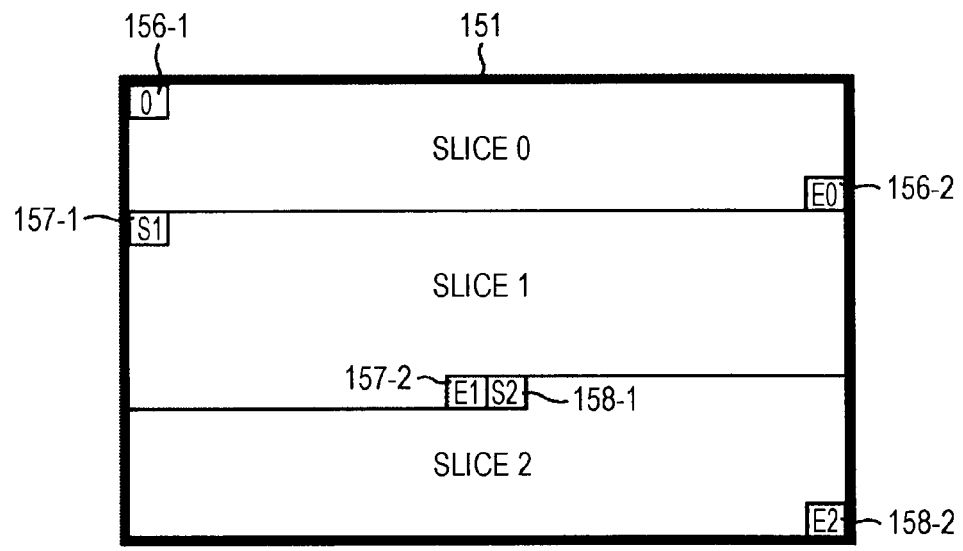
FIG. 5 is a diagram describing an example of multi-slice.

Now, with H.264/AVC, once frame can be divided into multiple slices, and image compression information can be output for each slice. FIG. 5 is a diagram for describing an example of multi-slice. In the case of the example in FIG. 5, the frame 151 is divided into the three slices of slice 0, slice 1, and slice 2.

By outputting image compression information in finer slice increments than frames, the image encoding device can generate and output image compression information at shorter intervals. That is to say, the image decoding device which decodes the image compression information can start decoding of the image compression information at an earlier stage. That is to say, the delay time from the image being input to encoding processing and encoding processing being performed and the image being output can be shortened.

NPL 2 which describes BALF does not disclose this multi-slice. That is to say, only setting ALF blocks for the entire frame is described. However, in the case of multi-slice, there are cases where normal filter processing cannot be performed as to pixels near the boundary of slices.

Figure 6:
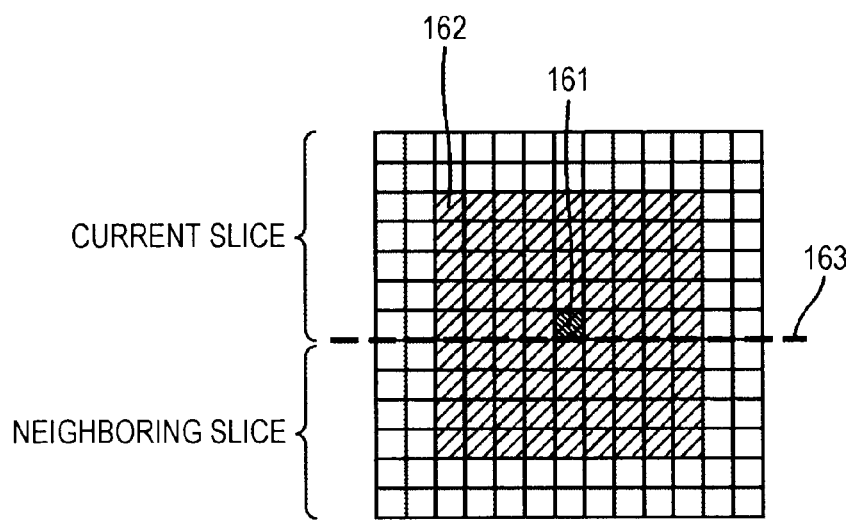
FIG. 6 is a diagram describing surrounding pixels used for filter processing.

FIG. 6 is a diagram illustrating the way in which filter processing is performed as to pixels near the slice boundary. In the case of performing filter processing as to the pixels to be processed, the adaptive filter processing unit 113 performs this using pixels within a predetermined range around the pixel to be processed (surrounding pixels). For example, in the case of FIG. 6, the adaptive filter processing unit 113 performs filter processing on a pixel to be processed 161 using 9×9 surrounding pixels 162 shown with hatching.

However, as shown in FIG. 6, the pixel to be processed 161 is a pixel near the slice boundary 163. Now, the slice boundary 163 indicates the boundary between a slice to be currently processed (current slice) and a slice neighboring the slice to be processed (neighboring slice). That is to say, the slice boundary 163 indicates the outer frame of the current slice.

As shown in FIG. 6, surrounding pixels 162 used for filter processing of the pixel to be processed 161 near the slice boundary 163 partially cross over the slice boundary 163 and straddle the region of the neighboring slice. That is to say, in order to perform filter processing of the pixel to be processed 161 in the same way as with a normal case, the pixel values of the neighboring slice are necessary, as shown in A in FIG. 7 for example.

Figure 7:
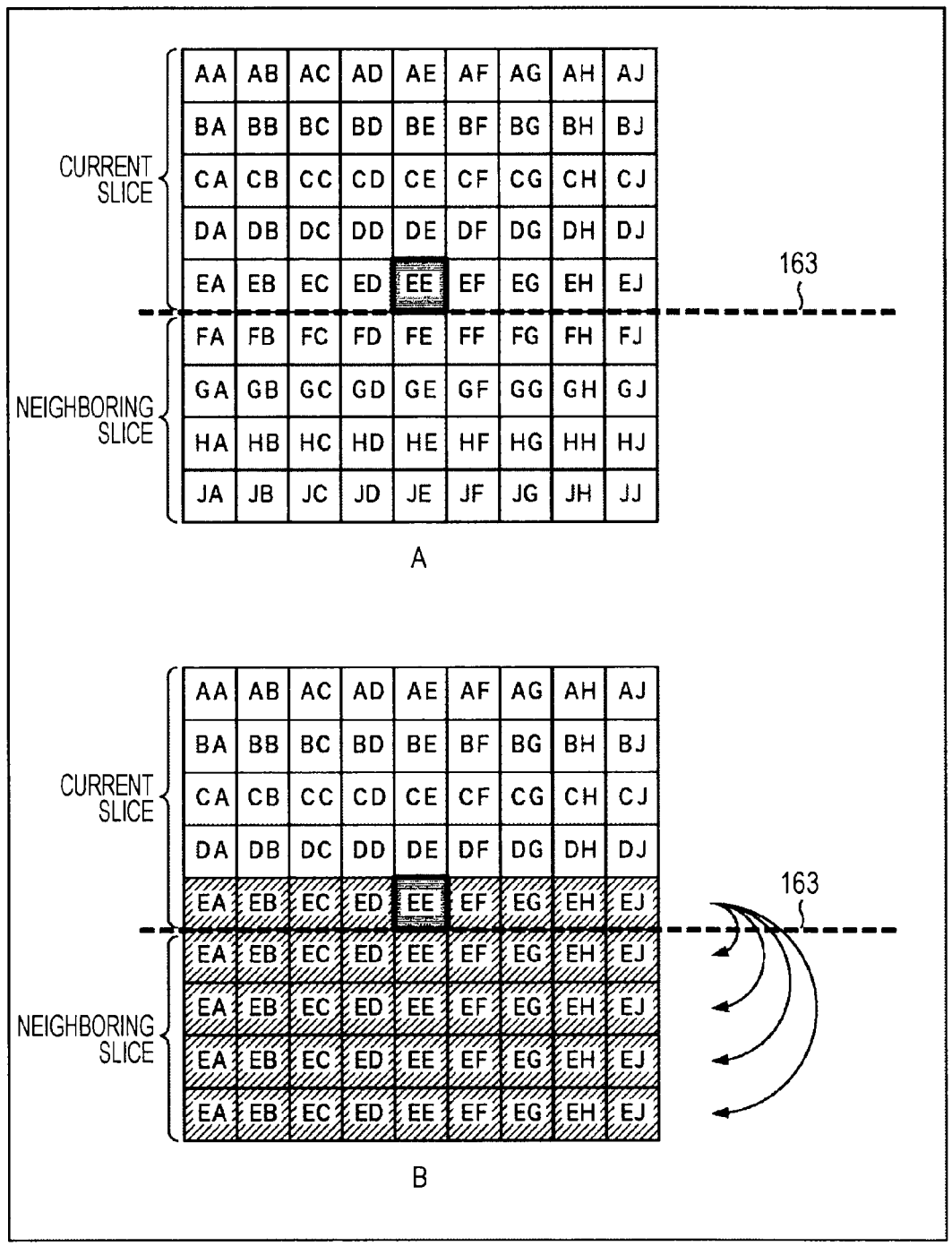
FIG. 7 is a diagram describing the way in which filter processing is performed close to a boundary.

In the case of the example in A in FIG. 7, the adaptive filter processing unit 113 performs filter processing as to the pixel EE which is the pixel to be processed, using the pixel AA through pixel JJ in both the current slice and the neighboring slice.

However, in order to do this, generating of the decoded image of the neighboring slice needs to be waited for. Accordingly, in this case, there has been the concern that the delay time of encoding processing would increase.

On the other hand, there is a method for generating and using dummy data, as shown in B in FIG. 7, for example. In the case of the example in B in FIG. 7, the adaptive filter processing unit 113 duplicates the pixel EA through pixel EJ adjacent to the slice boundary 163, thereby generating pixels within the neighboring slice for the surrounding pixels 162 (dummy data). The adaptive filter processing unit 113 performs filter processing as to the pixel EE using the generated dummy data.

Thus, the adaptive filter processing unit 113 does not need to wait for pixels of the neighboring slice to be generated, and filter processing of the pixel EE can be performed at an earlier stage than with the case of A in FIG. 7.

That is to say, with the case of the method of A in FIG. 7 using the pixels of the neighboring slice, the adaptive filter processing unit 113 uses actual data, so filter processing can be performed more suitable for the contents of the actual image. That is to say, great improvement of image quality due to filter processing can be expected.

On the other hand, in the case of the method in B in FIG. 7, the adaptive filter processing unit 113 does not need data of the adjacent slice for filter processing, and processing can be performed with the data of the current slice alone, so filter processing can be performed at an earlier stage.

Which method is desirable differs depending on the system specifications, user requests, and so forth. For example, if the system emphasizes image quality, the method shown in A in FIG. 7, but the method in A in FIG. 7 consumes a greater amount of memory than the method in B in FIG. 7, and there is the concern that the delay time will increase. Accordingly, depending on the memory capacity which can be used with the system and the tolerable delay time length, there may be causes where the method of B in FIG. 7 is more desirable.

The boundary control flag controls the method of filter processing as to such pixels near a boundary.

Returning to FIG. 3, the boundary control flag generating unit 132 generates such boundary control flags. The boundary control flag generating unit 132 has a system specification managing unit 141, a determining unit 142, and a generating unit 143.

The system specification managing unit 141 manages the specifications of the system performing image processing (hardware resources, usage purpose, etc.) including the image encoding device 100. For example, the system specification managing unit 141 may be arranged to manage the specifications (hardware resources, usage purpose, etc.) of the image decoding device encoded at the image encoding device 100.

The determining unit 142 determines whether or not the pixel to be processed is a pixel near the boundary. The generating unit 143 generates boundary control flags for the pixels to be processed which have been determined to be pixels near the boundary.

Figure 8:
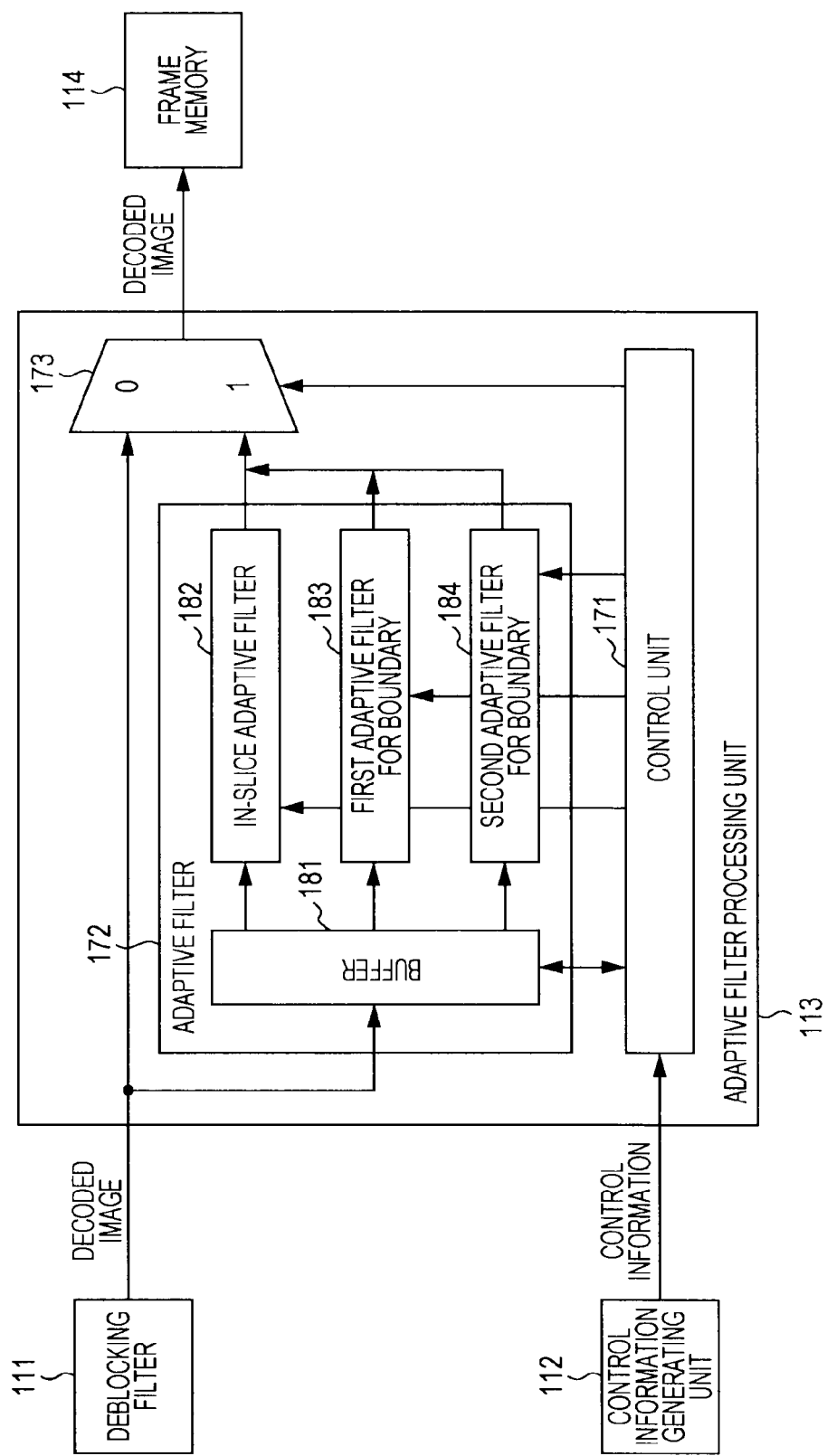
FIG. 8 is a block diagram illustrating a primary configuration example of an adaptive filter processing unit.

FIG. 8 is a block diagram illustrating a primary configuration example of the adaptive filter processing unit 113 in FIG. 1.

The adaptive filter processing unit 113 performs filter processing on the decoded image supplied from the deblocking filter 111 using the control information supplied from the control information generating unit 112.

Figure 9:
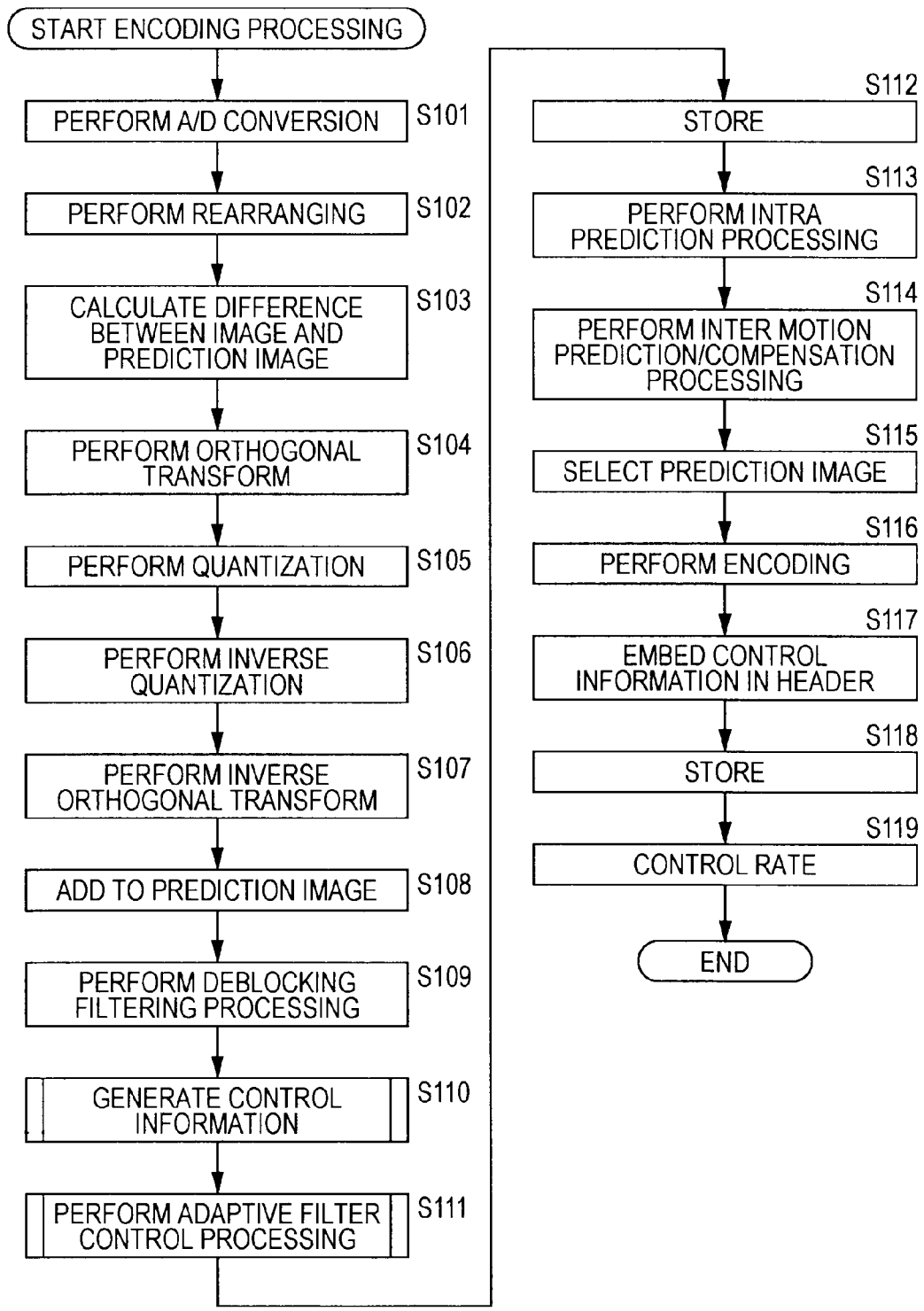
FIG. 9 is a flowchart describing an example of the flow of encoding processing.

As shown in FIG. 9, the adaptive filter processing unit 113 has a control unit 171, an adaptive filter 172, and a selecting unit 173.

The control unit 171 controls the adaptive filter 172 and the selecting unit 173. For example, the control unit 171 obtains control information from the control information generating unit 112, and controls the filter processing based on this control information.

The adaptive filter 172 performs filter processing of a region in the decoded image supplied from the deblocking filter 111, specified as ALF blocks to be processed from the control unit 171, using a filter coefficient set by the control unit 171.

The adaptive filter 172 has a buffer 181, an in-slice adaptive filter 182, a first adaptive filter for boundary 183, and a second adaptive filter for boundary 184.

The buffer 181 temporarily holds a decoded image supplied from the deblocking filter 111. The buffer 181 can hold not only the slice to be processed, but also the slice neighboring the slice to be processed (neighboring slice).

The in-slice adaptive filter 182 performs filter processing as to pixels to be processed which are not near the slice boundary and regarding which pixels of the neighboring slice are not included in the surrounding pixels, under control of the control unit 171. That is to say, the in-slice adaptive filter 182 performs filter processing using only pixels of the current slice.

The first adaptive filter for boundary 183 performs filter processing straddling slices on pixels to be processed which are near the slice boundary and regarding which pixels of the neighboring slice are included in the surrounding pixels, under control of the control unit 171. That is to say, the first adaptive filter for boundary 183 performs filter processing using the pixels of the current slice and neighboring slice, with a method such as shown in A in FIG. 7. Accordingly, the first adaptive filter for boundary 183 starts filter processing after pixels of the adjacent slice have been accumulated in the buffer 181.

The second adaptive filter for boundary 184 performs filter processing closed to the current slice, on pixels to be processed which are near the slice boundary and regarding which pixels of the neighboring slice are included in the surrounding pixels, under control of the control unit 171. That is to say, the second adaptive filter for boundary 184 performs filter processing by generating dummy data as necessary, using the pixels of the current slice alone, with a method such as shown in B in FIG. 7. Accordingly, the second adaptive filter for boundary 184 starts filter processing upon pixels of the current slice being accumulated in the buffer 181.

The control unit 171 selects one of the in-slice adaptive filter 182, first adaptive filter for boundary 183, and second adaptive filter for boundary 184, following the position of the pixel to be processed and the value of the boundary control flag included in the control information, and causes the selected processing unit to execute filter processing with its own method.

Also, the control unit 171 controls the filter processing start timing of the selected processing unit (in-slice adaptive filter 182, first adaptive filter for boundary 183, or second adaptive filter for boundary 184), in accordance with the accumulation state of the image in the buffer 181.

The adaptive filter 172 (in-slice adaptive filter 182, first adaptive filter for boundary 183, or second adaptive filter for boundary 184) supplies the filter processing results to the selecting unit 173.

Under control of the control unit 171, the selecting unit 173 selects one of the decoded image supplied from the deblocking filter 111 (decoded image not subjected to adaptive filter processing) and the decoded image supplied from the adaptive filter 172 (decoded image subjected to adaptive filter processing), supplies this to the frame memory 114, and stores as a reference image.

The control unit 171 controls the selecting unit 173 following the value of the filter block flag included in the control information to select one of the decoded image not subjected to adaptive filter processing and the decoded image subjected to adaptive filter processing.

That is to say, the adaptive filter processing unit 113 performs filter processing only for a region in the decoded image supplied from the deblocking filter 111 regarding which indication has been made to perform filter processing by the filter block flag (region regarding which determination has been made that image quality will be improved by filter processing).

[Flow of Processing]

Next, the flow of processing using the portions configured as described above will be described. First, an example of the low of encoding processing performed by the image encoding device 100 will be described with reference to the flowchart in FIG. 9.

In step S101, the A/D conversion unit 101 converts an input image from analog to digital. In step S102, the screen rearranging buffer 102 stores the A/D converted image, and performs rearranging from the sequence for displaying the pictures to the sequence for encoding.

In step S103, the computing unit 103 computes difference between an image rearranged by the processing in step S102 and the prediction image. The prediction image is supplied to the computing unit 103 from the motion compensation unit 116 in the event of performing inter prediction, and from the intra prediction unit 115 in the event of performing intra prediction, via the prediction image selecting unit 118.

The difference data is smaller in the data amount as compared to the original image data. Accordingly, the data amount can be compressed as compared to the case of encoding the original image without change.

In step S104, the orthogonal transform unit 104 subjects the difference information generated by the processing in step S103 to orthogonal transform. Specifically, orthogonal transform, such as discrete cosine transform, Karhunen-Loéve transform, or the like, is performed, and a transform coefficient is output. In step S105, the quantization unit 105 quantizes the transform coefficient. At the time of this quantization, a rate is controlled such as later-described processing in step S119 will be described.

The difference information thus quantized is locally decoded as follows. Specifically, in step S106, the inverse quantization unit 108 subjects the transform coefficient quantized by the quantization unit 105 to inverse quantization using a property corresponding to the property of the quantization unit 105. In step S107, the inverse orthogonal transform unit 109 subjects the transform coefficient subjected to inverse quantization by the inverse quantization unit 108 to inverse orthogonal transform using a property corresponding to the property of the orthogonal transform unit 104.

In step S108 the computing unit 110 adds the prediction image input via the prediction image selecting unit 118 to the locally decoded difference information, and generates a locally decoded image (the image corresponding to the input to the computing unit 103). In step S109, the deblocking filter 111 subjects the image output from the computing unit 110 to filtering. Thus, block noise is removed.

Upon the above processing being performed for one slice, in step S110 the control information generating unit 112 generates control information to be used for adaptive filter processing. The details of the control information generating processing will be described later in detail.

Upon control information such as filter coefficients, ALF block size, and filter block flag and the like being generated by the processing in step S110, in step S111 the adaptive filter processing unit 113 performs adaptive filter processing on the decoded image subjected to the deblocking filter processing in the processing of step S109. Details of this adaptive filter processing will be described later.

In step S112, the frame memory 114 stores the image subjected to adaptive filter processing in step S111.

In step S113, the intra prediction unit 115 performs intra prediction processing in the intra prediction mode. In step S114, the motion prediction unit 117 and motion compensation unit 116 perform motion prediction/compensation processing in the inter prediction mode.

In step S115, the prediction image selecting unit 118 selects one of a prediction image generated by intra prediction processing or a prediction image generated by inter motion prediction/compensation processing, in accordance with the prediction mode of the frame to be processed. The prediction image selecting unit 118 supplies the selected prediction image to the computing units 103 and 110. This prediction image is, as described above, used for calculations in steps S103 and S108.

In step S116, the lossless encoding unit 106 encodes the quantized transform coefficient output from the quantization unit 105. Specifically, the difference image is subjected to lossless encoding such as variable length coding, arithmetic coding, or the like, and compressed. At this time, the lossless encoding unit 106 also encodes the control information generated in step S110, the intra prediction mode information for intra prediction processing in step S113, the inter prediction mode for inter motion prediction/compensation processing in step S114, and so forth.

In step S117, the lossless encoding unit 106 embeds (describes) metadata such as the encoded control information and so forth in the slice header. This metadata read out and used for when performing image decoding. By including (multiplexing) the metadata necessary for decoding processing in this way, execution of decoding processing is enabled in increments finer than frame increments, and increase of delay time can be suppressed.

In step S118, the storing buffer 107 stores a difference image as a compressed image. The compressed image stored in the storing buffer 107 is read out as appropriate and transmitted to the decoding side via the transmission path.

In step S119, the rate control unit 119 controls the rate of the quantization operation of the quantization unit 105, so that overflow or underflow does not occur, based on the compressed image stored in the storing buffer 107.

Next, description will be made of an example of the flow of control information generating processing executed by the control information generating unit 112 in step S110 in FIG. 10 will be described with reference to the flowchart in FIG. 11.

Upon the control information generating processing being started, the filter coefficient calculating unit 131 of the control information generating unit 112 calculates a filter coefficient using the input image supplied from the screen rearranging buffer 102 and the decoded image subjected to deblocking filter processing that is supplied from the deblocking filter 111. For example, the filter coefficient calculating unit 131 determines the value of the filter coefficient such that the residual of the input image and decoded image is the smallest.

Upon the filter coefficient being calculated, in step S132 the boundary control flag generating unit 132 generates a boundary control flag for controlling the adaptive filter processing method as to the pixel near the boundary. Details will be described later.

Upon a boundary control flag being generated, in step S133 the block information generating unit 133 generates block information including ALF block size and filter block flag. The ALF block size may be determined beforehand, or may be set as appropriate in accordance with the contents of the image. In this case, the block information generating unit 133 calculates a cost value evaluating the filter processing results using a cost function, and determines the ALF block size such that the cost value is the smallest, for example.

Also, the block information generating unit 133 determines the value of the filter block flag depending on whether the image quality is improved in the event that the filter processing is applied to the ALF block to be processed. For example, in the event of determining that image quality is improved by applying the filter processing, the block information generating unit 133 sets the value of the filter block flag to "1" which indicates that filter processing is to be performed, and in the event of determining that image quality deteriorates by applying the filter processing, sets the value of the filter block flag to "0" which indicates that filter processing is not to be performed.

Upon block information being generated, the flow returns to step S110 in FIG. 9, and processing from step S111 and on is performed.

Note that the calculation of the filter coefficient performed in step S131 may be performed in frame increments. In this case, the processing in step S131 may be performed only on a predetermined slice within the frame (e.g., a slice where the identification number within the frame is a predetermined value (e.g., "0"), or a slice first processed within the frame, or the like), with this value used for the other slices. Also, an arbitrary image can be used for calculation of filter coefficients. For example, calculation may be performed based on past frame images.

Next, an example of the flow of boundary control flag setting processing executed in step S132 in FIG. 10 will be described with reference to the flowchart in FIG. 11.

Upon the boundary control flag setting processing being started, in step S151 the system specification managing unit 141 of the boundary control flag generating unit 132 obtains system specification information.

This system specification information is information including the hardware resources and usage purpose and so forth of the system including the image encoding device 100, for example. Hardware resources are hardware resources of the devices configuring the system (including the image encoding device 100), and for example includes processing capabilities, usable memory capacity, bus transmission speed, and so forth. Also, usage purpose is the operation mode of the overall system or individual devices, and includes, for example, whether to operate with emphasis on image quality, whether to operate with emphasis on speed, and so forth. Of course, information other that these may be included in the system specification information.

This system specification information may be stored beforehand in memory or the like built into the system specification managing unit 141. In this case, the system specification managing unit 141 reads out the system specification information from the memory by the processing in step S151. Also, at the time of the processing in step S151, the system specification managing unit 141 may collect specification information such as described above from parts of the image encoding device 100 and from other devices and so forth.

Upon obtaining the system specification information, the system specification managing unit 141 supplies this to the determining unit 142.

In step S152, the determining unit 142 determines whether or not to use the next slice for filter processing near the boundary, based on the supplied system specification information (hardware resources, usage purpose, etc.). That is to say, in the event that a pixel near a boundary with the neighboring slice being included in surrounding pixels is the pixel to be processed, the determining unit 142 determines whether to perform filter processing straddling slices, or to perform filter processing closed at the current slice.

For example, in the event that increased delay time is tolerable, and there is sufficient memory capacity available at the image encoding device 100 and image decoding device and the like, the determining unit 142 selects filter processing straddling slices. Also, for example, in the event that increase in delay time is intolerable or there are not sufficient hardware resources in the devices of the system, the determining unit 142 selects filter processing closed at the current slice.

In the event that determination has been made to use the next slice, i.e., to perform filter processing straddling slices, the flow advances to step S153. In step S153 the generating unit 143 generates a boundary control flag with a value "1".

Also, in the event that determination has been made not to use the next slice, i.e., to perform filter processing closed at the current slice, the flow advances to step S154. In step S154 the generating unit 143 generates a boundary control flag with a value "0".

Upon generating the boundary control flag, the generating unit 143 supplies this to the adaptive filter processing unit 113 and lossless encoding unit 106. The lossless encoding unit 106 encodes the boundary control flag supplied from the generating unit 143 as control information, and embeds this in the slice header or the like of the current slice. The adaptive filter processing unit 113 controls adaptive filter processing using the boundary control flag supplied from the generating unit 143.

Figure 10:
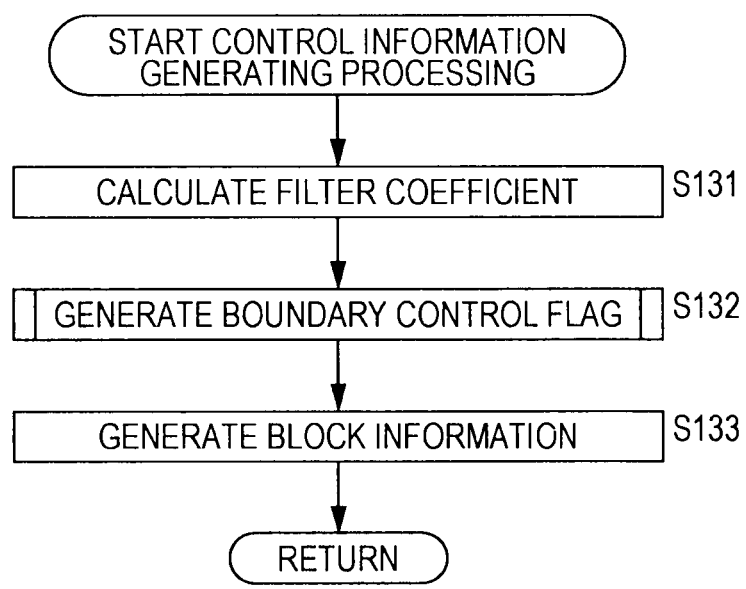
FIG. 10 is a flowchart describing an example of the flow of control information generating processing.
Figure 11:
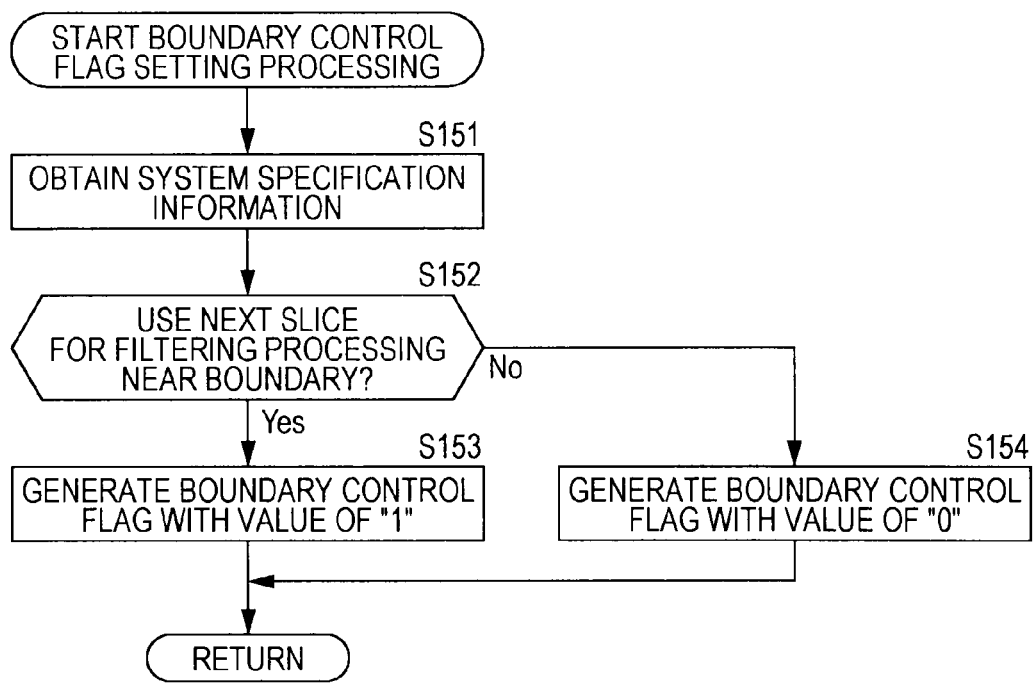
FIG. 11 is a flowchart describing an example of the flow of boundary control flag setting processing.

Upon the processing of step S153 or step S154 ending, the boundary control flag setting processing ends, the flow returns to step S132 in FIG. 10, and processing of step S133 and on is performed.

Next, an example of the flow of adaptive filter processing executed in step S111 in FIG. 9 will be described with reference to the flowchart in FIG. 12.

Upon adaptive filter processing being started, in step S171 the buffer 181 obtains the decoded image of the slice to be processed from the deblocking filter 111. Upon the slice to be processed being obtained, in step S172 the control unit 171 identifies the region of the slice to be processed.

In order to know the region of the current slice which is to be processed, this can be found by knowing the macroblocks included in the current slice, and knowing the pixels included in the macroblocks therefrom. The control unit 171 obtains the start macroblock address of the current slice from the slice header.

Now, the start macroblock address is a number assigned to macroblocks in raster scan order from the upper left of the screen. As shown in FIG. 5, the macroblock address at the upper left in the image (frame 151) is 0. Slice 0 is started from the upper left of the frame 151, so the macroblock address of the start macroblock 156-1 of the slice 0 is 0. Following this order, the end macroblock 156-2 or the slice 0 is E0. Also, in the same way as with this slice 0, the macroblock address of the start macroblock 157-1 of slice 1 is S1, and the macroblock address of the end macroblock 15721 is E1. Further, the macroblock address of the start macroblock 158-1 of slice 2 is S2, and the macroblock address of the end macroblock 158-2 is E2.

As the current slice is decoded, one macroblock address is added each time decoding processing of one macroblock is completed, and eventually the end macroblock of the current slice is reached. A flag indicating the end macroblock of the slice is set at the end macroblock. Due to these, all macroblock addresses which the current slice holds can be known. That is to say, this is from the start macroblock address to the end macroblock address.

Now, with a sequence parameter set (SPS (Sequence Parameter Set)) of an AVC stream (image compression information), the image size of one frame is indicated by the number of macroblocks. pic_height_in_map_units_minus1 indicates the number of macroblocks in the vertical direction of the image. pic_width_in_mbs_minus1 indicates the number of macroblocks in the horizontal direction of the image.

Accordingly, from the macroblock address, the position of the macroblock is expressed by the following Expression (2) and Expression (3).

$$mbx = \text{macro block address} \% pic\_width\_in\_mbs\_minus1 \quad (2)$$

$$mby = \text{floor}[\text{macro block address}/pic\_width\_in\_mbs\_minus1] \quad (3)$$

In Expression (2) and Expression (3), mbx indicates which number from the left the macroblock is, and mby indicates what number from the top the macroblock is. Also, floor [z] indicates z being rounded out at the decimal so as to be an integer, and A % B indicates the remainder of having divided A with B.

If we say that the size of the macroblock is determined to be 16×16 pixels, the vertical direction and horizontal direction position of the pixel at the upper left of the macroblock is (16×mbx, 16×mby), and the pixels included in the macroblock are pixels included in the range of 16 pixels to the lower direction and 16 pixels to the right direction form the upper left pixel position. Thus far, all pixels of the current slice can be known. That is to say, the region of the slice to be processed is identified.

In step S173, the control unit 171 obtains one filter block flag generated at the control information generating unit 112.

In step S174, the control unit 171 determines one of unprocessed ALF blocks to be the ALF block to be processed. The order of selection of ALF blocks is determined beforehand, and is in common with the selection order at the control information generating unit 112. Further, the control unit 171 identifies the region of the ALF block to be processed which has been decided.

Since the image size of the frame is determined beforehand, upon the ALF block size being determined, the number of ALF blocks necessary to pave ALF blocks with the upper left of the frame as the point of origin (number of ALF blocks within the frame) can also be calculated. The setting values of the vertical direction size (number of pixels) and horizontal direction size (number of pixels) of the ALF blocks are provided beforehand, so the control unit 171 determines size of the ALF blocks and the number of ALF blocks following the setting values, and places the ALF blocks as to the decoded image.

Note that the number of ALF blocks is calculated by the following Expression (4) and Expression (5).

$$num\_alf\_block\_x = \text{floor}[(16 \times (pic\_width\_in\_mbs\_minus1+1)+(alf\_block\_size-1))/alf\_block\_size] \quad (4)$$

$$num\_alf\_block\_y = \text{floor}[(16 \times (pic\_height\_in\_map\_units\_minus1+1)+(alf\_block\_size-1))/alf\_block\_size] \quad (5)$$

In Expression (4) and Expression (5), num_alf_block_x and num_alf_block_y are the number of horizontal and vertical ALF blocks included in the image, respectively. Also, alf_block_size represents the size of one side of an ALF block. To simplify description here, we will say that ALF blocks are squares. Of course, an arrangement may be made where the vertical direction size and horizontal direction size of the ALF blocks are different from each other.

The position of the i'th ALF block is expressed by the following Expression (6) and Expression (7).

$$alf\_block\_x = 1\%(num\_alf\_block\_x-1) \quad (6)$$

$$alf\_block\_y = \text{floor}[i/(num\_alf\_block\_x-1)] \quad (7)$$

In Expression (6) and Expression (7), alf_block_x and alf_block_y each indicate what number in the horizontal direction and vertical direction the i'th ALF block is. The position of the upper left pixel of the i'th ALF block is a position obtained by multiplying each of alf_block_x and alf_block_y by the alf_block_size. That is to say, the horizontal direction is 16×alf_block_x, and the vertical direction is 16×alf_block_y. Accordingly, the region of the i'th ALF block is a range of alf_block_size×alf_block_size from the upper left pixel thereof.

In step S175, the control unit 171 determines whether or not a region of the slice to be processed is included within the region of the ALF block to be processed which ha been identified as described above. In the event that determination is made that the region of the slice to be processed is included, the flow advances to step S176.

In step S176, the control unit 171 determines whether or not the value of the filter block flag is 1. In the event that the value of the filter block flag is 1, and instruction has been given to perform filter processing regarding the ALF block to be processed, control is effected such that the selecting unit 173 selects the output of the filter 172, and the flow advances to step S177. In step S177, the control unit 171 selects the pixels to be processed in a predetermined order such as, for example, in raster scan order or the like, from unprocessed pixels.

In step S178, The control unit 171 determines whether or not pixels of the neighboring slice are necessary for filter processing of the selected pixel to be processed. In the event that pixels of the neighboring slice are included in the surrounding pixels of the pixel to be processed, and determination is made that the pixel to be processed is a pixel near the slice boundary, the flow advances to step S179.

In step S179, the control unit 171 determines whether or not the value of the boundary control value included in the control information obtained by the control information generating unit 112 is "1". In the event that determination is made that the value of the boundary control flag is "1", the flow advances to step S180.

In step S180, the control unit 171 selects first adaptive filter for boundary 183 as the adaptive filter, and causes the first adaptive filter for boundary 183 to perform filter processing straddling slices as shown in A in FIG. 7. Upon the processing of step S180 ending, the flow advances to step S183.

Also, in step S179, in the event that determination is made that the value of the boundary control flag is "0", the flow advances to step S181.

In step S181, the control unit 171 selects the second adaptive filter for boundary 184 as the adaptive filter, and causes the second adaptive filter for boundary 184 to perform filter processing closed at the current slice as shown in B in FIG. 7. Upon the processing of step S181 ending, the flow advances to step S183.

Also, in the event that determination is made in step S178 that the pixel to be processed is not a pixel near a slice boundary, the flow advances to step S182.

In step S182, the control unit 171 selects the in-slice adaptive filter 182 as the adaptive filter, and causes the in-slice adaptive filter 182 to perform normal filter processing using only pixels of the current slice. Upon the processing in step S182 ending, the flow advances to step S183.

Also, in the event that determination is made in step S176 that the value of the filter block flag is "02, the flow advances to step S183. Further, in the event that determination is made in step S175 that the ALF block to be processed does not include the region of the slice to be processed, the flow advances to step S183.

In step S183, the control unit 171 determines whether all pixels within the ALF block to be processed have been processed. In the event that determination is made that an unprocessed pixel exists, the flow returns to step S177 and the subsequent processing is repeated.

Also, in the event that determination is made in step S183 that all pixels within the ALF block to be processed have been processed, the flow advances to step S184.

In step S184, the control unit 171 determines whether all ALF blocks within the frame have been processed. In the event that determination is made that an unprocessed ALF block exists, the flow returns to step S173 and the subsequent processing is repeated. Also, in the event that determination is made in step S184 that all ALF blocks have been processed, adaptive filter control processing is ended, the flow returns to step S111 in FIG. 9, and the processing of step S122 and on is performed.

Note that the filter processing as to the pixels to be processed, performed in step S180 through step S182 are each executed independently as different tasks from the adaptive filter control processing. That is to say, in step S180 through step S182, upon executing of adaptive filter processing being specified, the adaptive filter processing is executed as appropriate. That is to say, these adaptive filter processing are executable in parallel with the adaptive filter control processing and adaptive filter processing as to other pixels.

Figure 13:
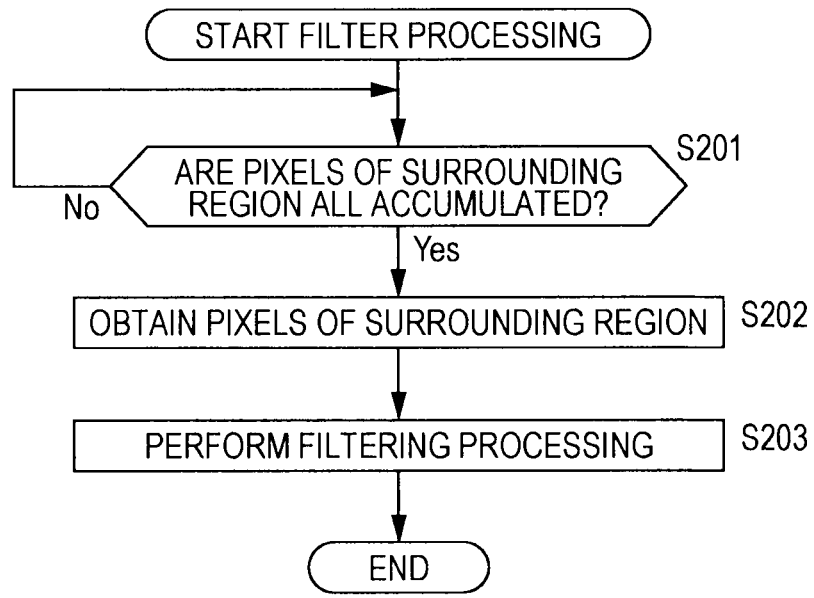
FIG. 13 is a flowchart describing an example of the flow of filter processing.
Figure 14:
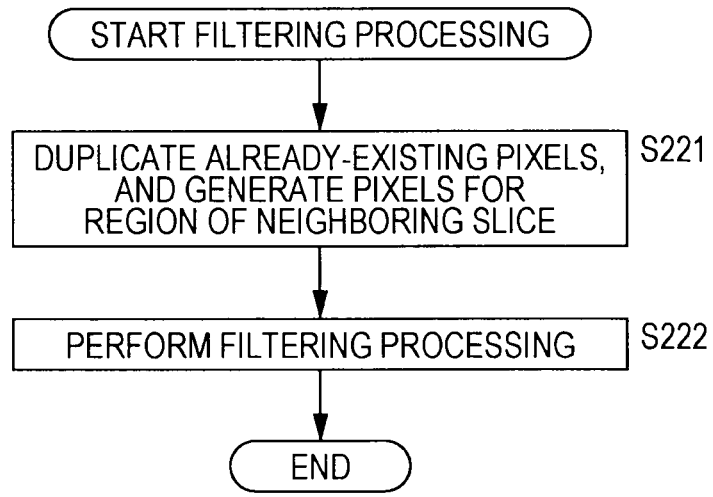
FIG. 14 is a flowchart describing an example of the flow of filter processing.

These filter processing will be described with reference to the flowchart in FIG. 13 and FIG. 14. First, an example of the flow of filter processing executed by the first adaptive filter for boundary 183 will be described with reference to the flowchart in FIG. 13.

Figure 12:
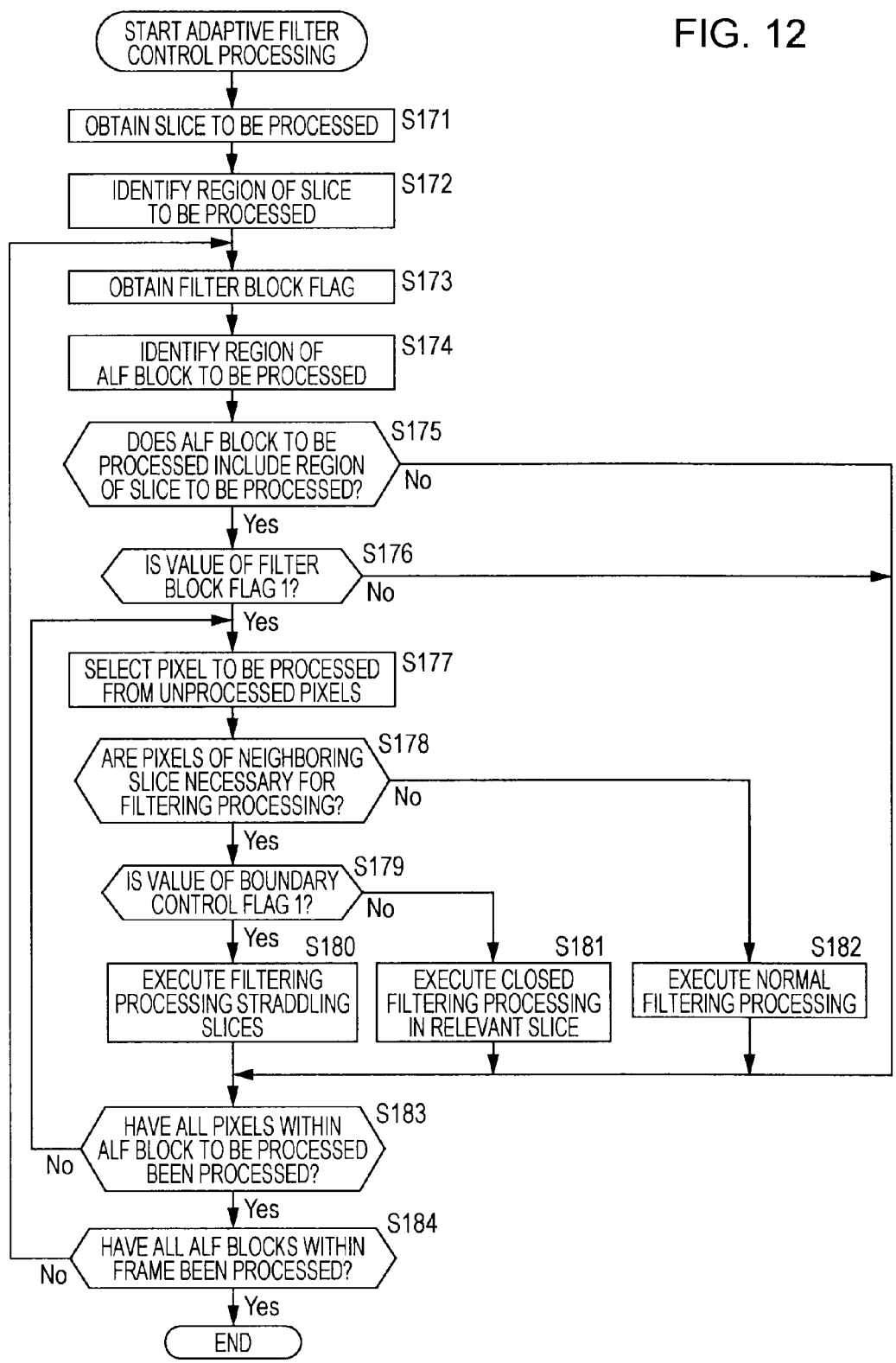
FIG. 12 is a flowchart describing an example of the flow of adaptive filter control processing.

Upon execution is instructed for filter processing straddling slices, of which execution is instructed in step S180 in FIG. 12, in step S201 the first adaptive filter for boundary 183 monitors the buffer 181, determines whether or not all pixels of the surrounding region of the pixel to be processed are accumulated, and stands by until accumulated. Pixels of the surrounding region (i.e., surrounding pixels) include pixels of the neighboring slice as well. In the event that determination is made that all the pixels have been accumulated in the buffer 181, the flow advances to step S202.

In step S202, the first adaptive filter for boundary 183 obtains pixels of the surrounding region (surrounding pixels) from the buffer 181 and in step S203 uses the surrounding pixels and the filter coefficient set at the control unit 171 to perform filter processing of the pixel to be processed. Upon filter processing ending, the first adaptive filter for boundary 183 supplies the filter processing results to the selecting unit 173, and filter processing ends.

In the event that the value of the filter block flag is "1", the selecting unit 173 selects the filter processing results, and supplies to the frame memory 114 as the decoded image subjected to filtering processing, so as to be stored.

Next, an example of the flow of filter processing executed by the second adaptive filter for boundary 184 will be described with reference to the flowchart in FIG. 14.

Upon execution is instructed to filter processing closed at the current slice, of which execution is instructed in step S181 in FIG. 12, in step S221 the second adaptive filter for boundary 184 duplicates surrounding pixels situated in the current slice already held in the buffer 181, and generates dummy data of the surrounding pixels situated in the neighboring slice.

Upon generating dummy data, in step S212 the second adaptive filter for boundary 184 uses the surrounding pixels including the dummy data and the filter coefficient set at the control unit 171 to perform filter processing of the pixel to be processed. Upon the filter processing ending, the second adaptive filter for boundary 184 supplies the filter processing results to the selecting unit 173 and the filter processing ends.

In the event that the value of the filter block flag is "1", the selecting unit 173 selects these filter processing results, and supply to the frame memory 114 as the decoded image subjected to filter processing, so as to be stored.

As described above, based on the value of the boundary control flag, the method for filter processing as a pixel near a boundary is selected as appropriate from multiple methods, whereby the adaptive filter processing unit 113 can suppress deterioration in the effects of filter processing due to local control of filter processing when encoding. For example, by performing filter processing so as to straddle slices, the adaptive filter processing unit 113 can improve the image quality of the filter processing. Also, by performing filter processing closed at the current slice, the adaptive filter processing unit 113 can perform filter processing with low delay.

At this time, the adaptive filter processing unit 113 selects the filter processing method based on the boundary control flag determined based on system specification information, so filter processing can be performed without breakdown of processing.

Also, the boundary control flag generating unit 132 sets a boundary flag based on the system specification information, whereby the adaptive filter processing unit 113 can be caused to execute filter processing so as to suppress deterioration of effects.

That is to say, the image encoding device 100 can suppress deterioration in the effects of filter processing due to local control of filter processing when encoding.

Note that the lossless encoding unit 106 encodes the boundary control flag and adds to the image compression information (embeds in the slice header, for example).

Accordingly, the image encoding device 100 can cause an image decoding device which decodes the image compression information output by the image encoding device 100 to suppress deterioration in the effects of filter processing due to local control of filter processing performed when decoding.

Now, to "add" means to correlate the boundary control flag to the image compression information with an optional form. For example, this may be described as a syntax of the image compression information, or may be describe as user data. Also, the boundary control flag may be in a state linked with the image compression information as metadata. That is to say, to "add" includes "embedding", "description", "multiplexing", "linking", and so forth.

Also, with the above, description has been made to perform filter processing straddling slices or filter processing closed at the current slice, as to pixels near the slice boundary, but filter processing may be performed with other methods as well. Also, instead of performing filter processing closed at the current slice, the filter processing may be omitted, for example.

Further, it is sufficient for multiple filter processing methods for a pixel near a slice boundary to have been prepared, and three or more methods may be prepared as options. In this case, two bits or more are necessary for the boundary control flag. Note that the number of bits of the boundary control flag is optional. However, the fewer the number of bits are, the more the deterioration of encoding efficiency of the image compression information is suppressed, so unnecessarily increasing the number of bits is undesirable.

2. Second Embodiment

Configuration of Device

Figure 15:
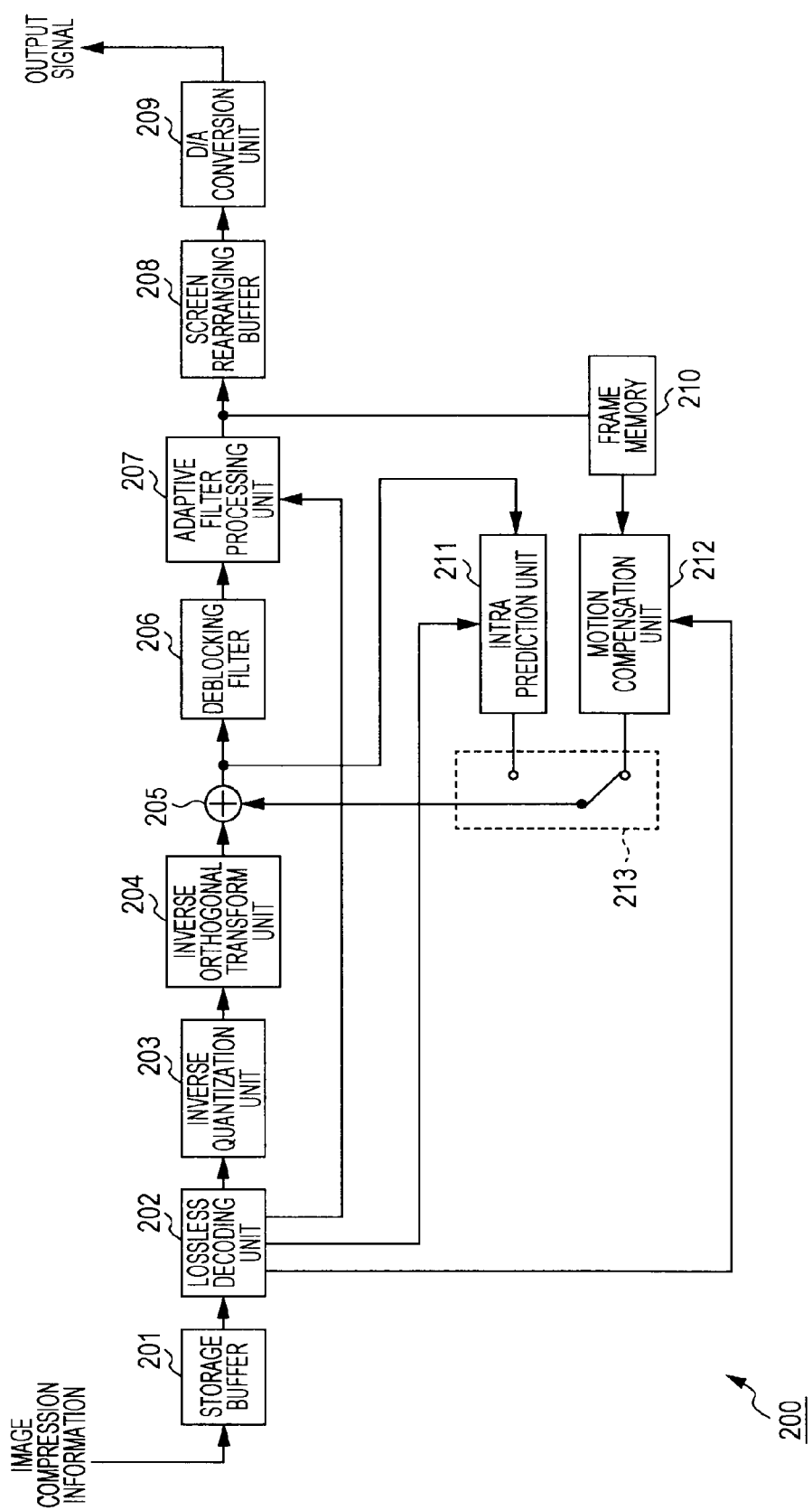
FIG. 15 is a block diagram illustrating a primary configuration example of an image decoding device to which the present invention has been applied.

Next, an image decoding device corresponding to the image encoding device 100 described with the first embodiment will be described. FIG. 15 is a block diagram illustrating the configuration of an embodiment of an image decoding device serving as an image processing device to which the present invention has been applied.

An image decoding device 200 decodes image compression information output from the image encoding device 100, and generates a decoded image.

An image decoding device 200 is configured of a storing buffer 201, a lossless decoding unit 202, an inverse quantization unit 203, an inverse orthogonal transform unit 204, a computing unit 205, and a deblocking filter 206. the image decoding device 200 also has an adaptive filter processing unit 207. The image decoding device 200 further has a screen rearranging buffer 208 and a D/A (Digital/Analog) conversion unit 209. The image decoding device 200 also has frame memory 210, an intra prediction unit 211, a motion compensation unit 212, and a selecting unit 213.

The storing buffer 201 stores a transmitted compressed image information. The lossless decoding unit 202 decodes information supplied from the storing buffer 201 and encoded by the lossless encoding unit 106 in FIG. 1 using a format corresponding to the encoding format of the lossless encoding unit 106.

In the event that the current macroblock has been intra encoded, the lossless decoding unit 202 decodes the intra prediction mode information stored in the header portion of the image compression information, and transmits this information to the intra prediction unit 211. Also, in the event that the current macroblock has been inter encoded, the lossless decoding unit 202 decodes the motion vector information stored in the header portion of the image compression information, and transmits the information thereof to the motion compensation unit 212.

Also, the lossless decoding unit 202 extracts control information for the adaptive filter (control information generated by the control information generating unit 112) from the slice header of the image compression information, and decodes, and supplies the information thereof to the adaptive filter processing unit 207.

The inverse quantization unit 203 subjects the image decoded by the lossless decoding unit 202 to inverse quantization using a format corresponding to the quantization format of the quantization unit 105 in FIG. 1. The inverse orthogonal transform unit 204 subjects the output of the inverse quantization unit 203 to inverse orthogonal transform using a format corresponding to the orthogonal transform format of the orthogonal transform unit 104 in FIG. 1.

The computing unit 205 adds the prediction image supplied from the selecting unit 213 to the difference information subjected to inverse orthogonal transform, and generates a decoded image. The deblocking filter 206 removes the block noise of the decoded image which has been generated by the adding processing.

The adaptive filter processing unit 207 performs filter processing on the image supplied from the deblocking filter 206 based on the filter coefficient, ALF block size, filter block flag, and boundary control flag and the like, supplied from the lossless encoding unit. The adaptive filter processing unit 207 performs adaptive filter processing in the same way as with the adaptive filter processing unit 113 in FIG. 1. Accordingly, the adaptive filter processing unit 207 can reduce block noise and noise due to quantization which could not be completely removed with the deblocking filter 206.

The adaptive filter processing unit 207 supplies the image following filter processing to the frame memory 210 so as to be stored as reference image information, and also outputs to the screen rearranging buffer 208.

The screen rearranging buffer 208 performs rearranging of images. That is to say, the order of frames rearranged for encoding by the screen rearranging buffer 102 in FIG. 1 is rearranged to the original display order. The D/A conversion unit 209 performs D/A conversion of the image supplied from the screen rearranging buffer 208, and outputs. For example, the D/A conversion unit 209 outputs the output signals obtained by performing D/A conversion to an unshown display, and displays an image.

The intra prediction unit 211 generates a prediction image based on the information supplied from the lossless decoding unit 202 in the event that the current frame has been intra encoded, and outputs the generated prediction image to the selecting unit 213.

In the event that the current frame has been intra encoded, the motion compensation unit 212 performs motion compensation processing as to the reference image information stored in the frame memory 210, based on the motion vector information supplied from the lossless decoding unit 202.

In the event that the current macroblock has been intra encoded, the selecting unit 213 connects to the intra prediction unit 211, and supplies the image supplied from the intra prediction unit 211 to the computing unit 205 as a prediction image. Also, in the event that the current macroblock has been inter encoded, the selecting unit 213 connects to the motion compensation unit 212 and supplies the image supplied from the motion compensation unit 212 to the computing unit 205 as a prediction image.

[Flow of Processing]

Figure 16:
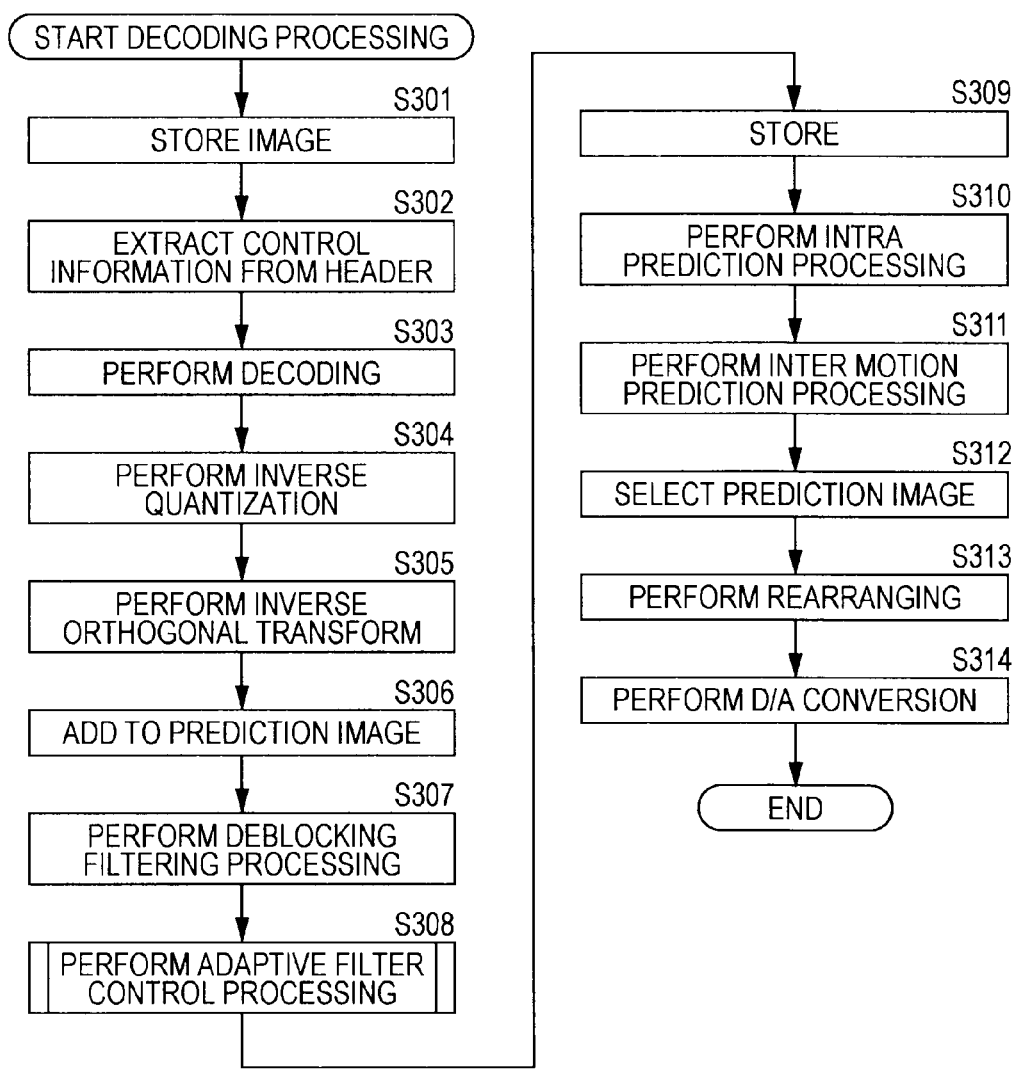
FIG. 16 is a flowchart describing an example of the flow of decoding processing.

An example of the flow of decoding processing which this image decoding device 200 executes will be described with reference to the flowchart in FIG. 16.

In step S301, the storing buffer 201 stores the transmitted image. In step S302, the lossless decoding unit 202 extracts the control information for adaptive filter processing from the slice header of the image compression information, and decodes this in step S303. The decoded control information is supplied to the adaptive filter processing unit 207.

Also, in step S303, the lossless decoding unit 202 decodes the compressed image supplied from the storing buffer 201. Specifically, the I picture, P picture, and B picture encoded by the lossless encoding unit 106 in FIG. 1 are decoded.

At this time, the motion vector information, reference frame information, prediction mode information (information indicating the intra prediction mode or inter prediction mode), and so forth are also decoded.

Specifically, in the event that the prediction mode information is intra prediction mode information, the prediction mode information is supplied to the intra prediction unit 211. In the event that the prediction mode information is inter prediction mode information, motion vector information and reference frame information corresponding to the prediction mode information are supplied to the motion compensation unit 212.

In step S304, the inverse quantization unit 203 inversely quantizes the transform coefficient decoded in step S302 using a property corresponding to the property of the quantization unit 105 in FIG. 1. In step S305, the inverse orthogonal transform unit 204 subjects the transform coefficient inversely quantized in step S204 to inverse orthogonal transform using a property corresponding to the property of the orthogonal transform unit 104 in FIG. 1. This means that difference information corresponding to the input of the orthogonal transform unit 104 in FIG. 1 (the output of the computing unit 103) has been decoded.

In step S306, the computing unit 205 adds the prediction image selected in the processing in later-described step S212 to the difference information. Thus, the original image is decoded. In step S307, the deblocking filter 206 subjects the image output from the computing unit 205 to filtering. Thus, block noise is removed.

In step S308, the adaptive filter processing unit 207 performs adaptive filter control processing for subjecting the image, subjected to deblocking filter processing, further to adaptive filter processing. This adaptive filter control processing is the same as the processing which the adaptive filter processing unit 113 in FIG. 1 performs. That is to say, this adaptive filter control processing is the same as the case described with reference to the flowchart in FIG. 12, other than using the control information supplied from the lossless decoding unit 202. Note however, the control information supplied from this lossless decoding unit 202 has been generated by the control information generating unit 112 in FIG. 1, and is substantially equivalent to the control information supplied from the control information generating unit 112 which the adaptive filter processing unit 113 in FIG. 1 uses.

Due to this adaptive filter control processing, block noise and noise due to quantization which could not be completely removed with the deblocking filter processing can be reduced.

In step S309, the frame memory 210 stores the image subjected to filtering.

In the event that intra prediction mode information has been supplied, in step S310 the intra prediction unit 211 performs intra prediction processing in the intra prediction mode. Also, in the event that inter prediction mode information has been supplied, in step S311 the motion compensation unit 212 performs motion compensation processing in the intra prediction mode.

In step S312, the selecting unit 213 selects a prediction image. That is to say, one of the prediction image generated by the intra prediction unit 211 and the prediction image generated by the motion compensation unit 212 is selected, and the selected prediction image is supplied to the computing unit 205.

For example, in the event of an image which has been intra encoded, the selecting unit 213 selects a prediction image generated by the intra prediction unit 211 and supplies this to the computing unit 205. Also, in the event of an image which as been inter encoded, the selecting unit 213 selects a prediction image generated by the motion compensation unit 212 and supplies this to the computing unit 205.

In step S313, the screen rearranging buffer 208 performs rearranging. Specifically, the sequence of frames rearranged for encoding by the screen rearranging buffer 102 of the image encoding device 100 is rearranged to the original display sequence.

In step S314, the D/A conversion unit 209 performs D/A conversion of the image from the screen rearranging buffer 208. This image is output to an unshown display, and the image is displayed.

Thus, with the image decoding unit 200, the lossless decoding unit 202 extracts control information supplied from the image encoding device 100 and decodes, and the adaptive filter processing unit 207 performs adaptive filter control processing (and filter processing) the same as with the adaptive filter processing unit 113 of the image encoding device 100, using this control information.

By performing such adaptive filter control processing, the adaptive filter processing unit 207 can suppress deterioration in the effects of filter processing due to local control of filter processing performed when decoding.

Accordingly, the image decoding device 200 can suppress deterioration in the effects of filter processing due to local control of filter processing performed when decoding.

3. Third Embodiment

Image Processing System

Note that while description has been made above that the system specification managing unit 141 of the control information generating unit 112 holds or corrects system specification information, the system specification information may be made to include specification information of the image decoding device.

In this case, in the event that the specification information of the image decoding device is not known beforehand, the image encoding device needs to collect the specification information of the image decoding device at a predetermined time, such as at the time of connecting communicably between the image encoding device and image decoding device, for example. At this time, the image encoding device may perform communication with the image decoding to obtain the specification information from the image decoding device, or specification input by the user, for example, may be obtained.

Figure 17:
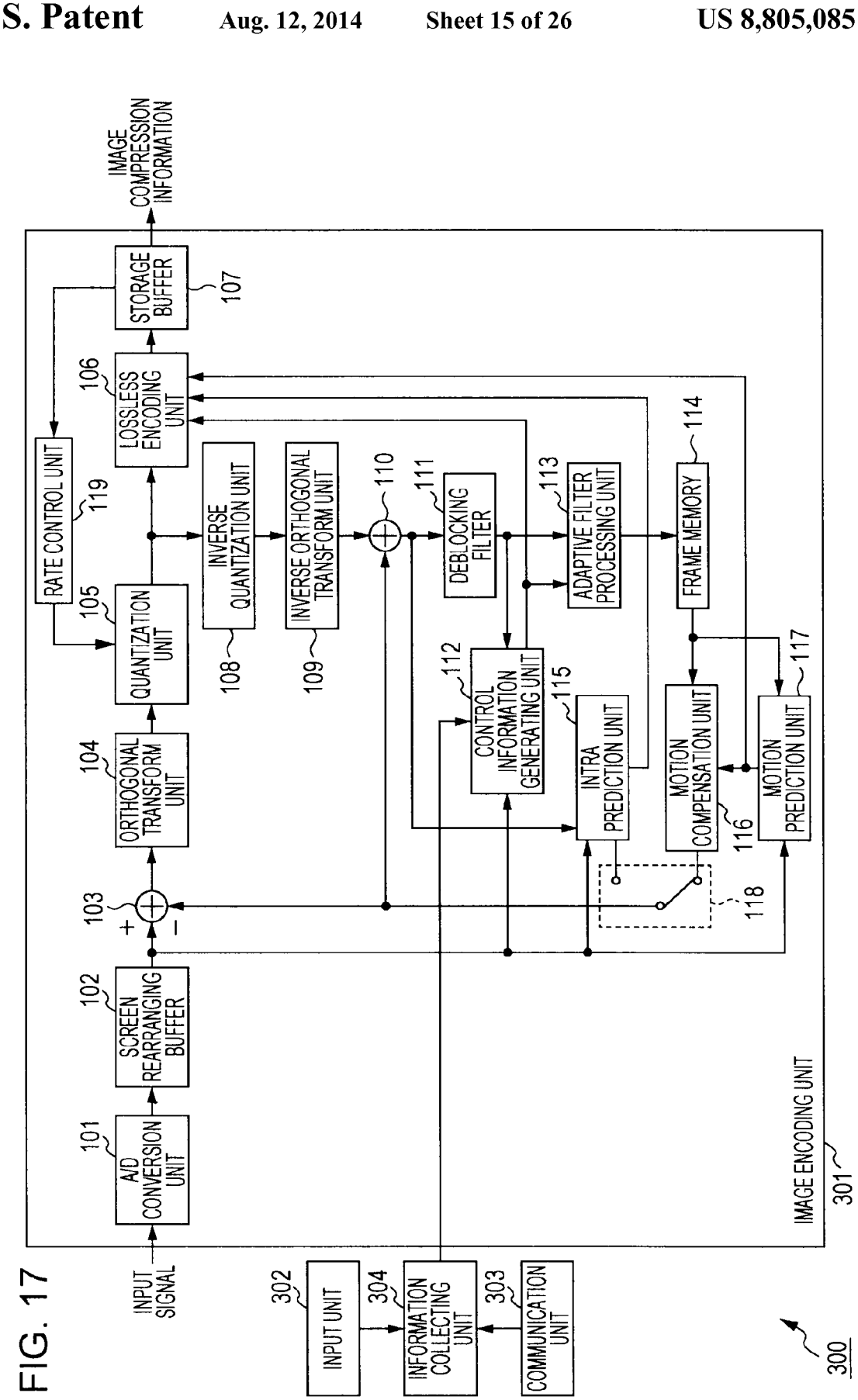
FIG. 17 is a block diagram illustrating another configuration example of an image encoding device to which the present invention has been applied.
Figure 18:
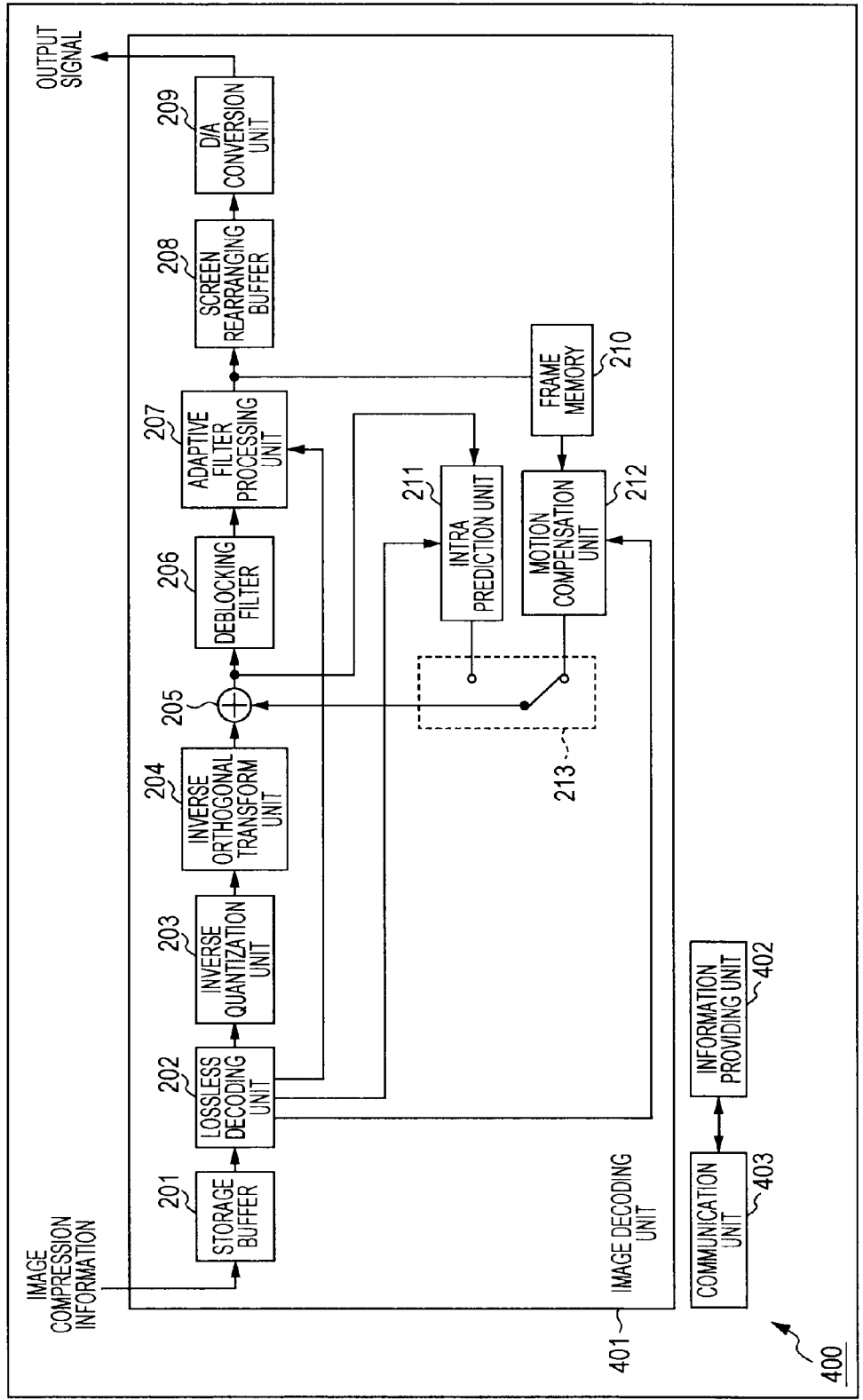
FIG. 18 is a block diagram illustrating another configuration example of an image decoding device to which the present invention has been applied.

Now, an unshown image processing system is a system where an image encoding device 300 shown in FIG. 17 and an image decoding device 400 shown in FIG. 18 are communicably connected via a communication medium such as a network. The following is a description of the configuration of the devices.

FIG. 17 is a block diagram illustrating another example of an image encoding device serving as an image processing device to which the present invention has been applied.

The image encoding device 300 is basically the same device as the image encoding device 100 in FIG. 1, and has an image encoding unit 301.

The configuration of the image encoding unit 301 is the same as the configuration of the image encoding device 100, having the A/D conversion unit 101 through rate control unit 119, and operates in the same way as with the case described with the first embodiment.

Besides the image encoding unit 301, the image encoding device 300 further has an input unit 302, communication unit 303, and information collecting unit.

The input unit 302 accepts operations of the user and the like. The communication unit 303 performs communication with the image decoding device 400 via a network or the like. The information collecting unit 304 collects specification information of the image decoding device 400 input via the input unit 302 or specification information supplied from the image decoding device 400 via the communication unit 303. The information collecting unit 304 supplies the collected specification information to the system specification managing unit 141 of the control information generating unit 112.

FIG. 18 is a block diagram illustrating another example of an image decoding device serving as an image processing device to which the present invention has been applied.

The image decoding device 400 is basically the same device as the image decoding device 200 in FIG. 15, and has an image decoding unit 401.

The configuration of the image decoding unit 401 is the same as the configuration of the image decoding device 200, having the storing buffer 201 through selecting unit 213, and operates in the same way as with the case described with the second embodiment.

Besides the image decoding unit 401, the image decoding device 400 further has an information providing unit 402 and communication unit 403.

The information providing unit 402 has specification information of the image decoding device 400, and based on a request from the image encoding device 300, provides the specification information. The communication unit 403 performs communication with the image encoding device 300 via a network or the like. The communication unit 403 accepts a request from the image encoding device 300, and supplies this to the information providing unit 402. the communication unit 403 also supplies the specification information of the image decoding device 400 supplied from the information providing unit 402 in accordance with the request to the image encoding device 300.

[Flow of Processing]

Figure 19:
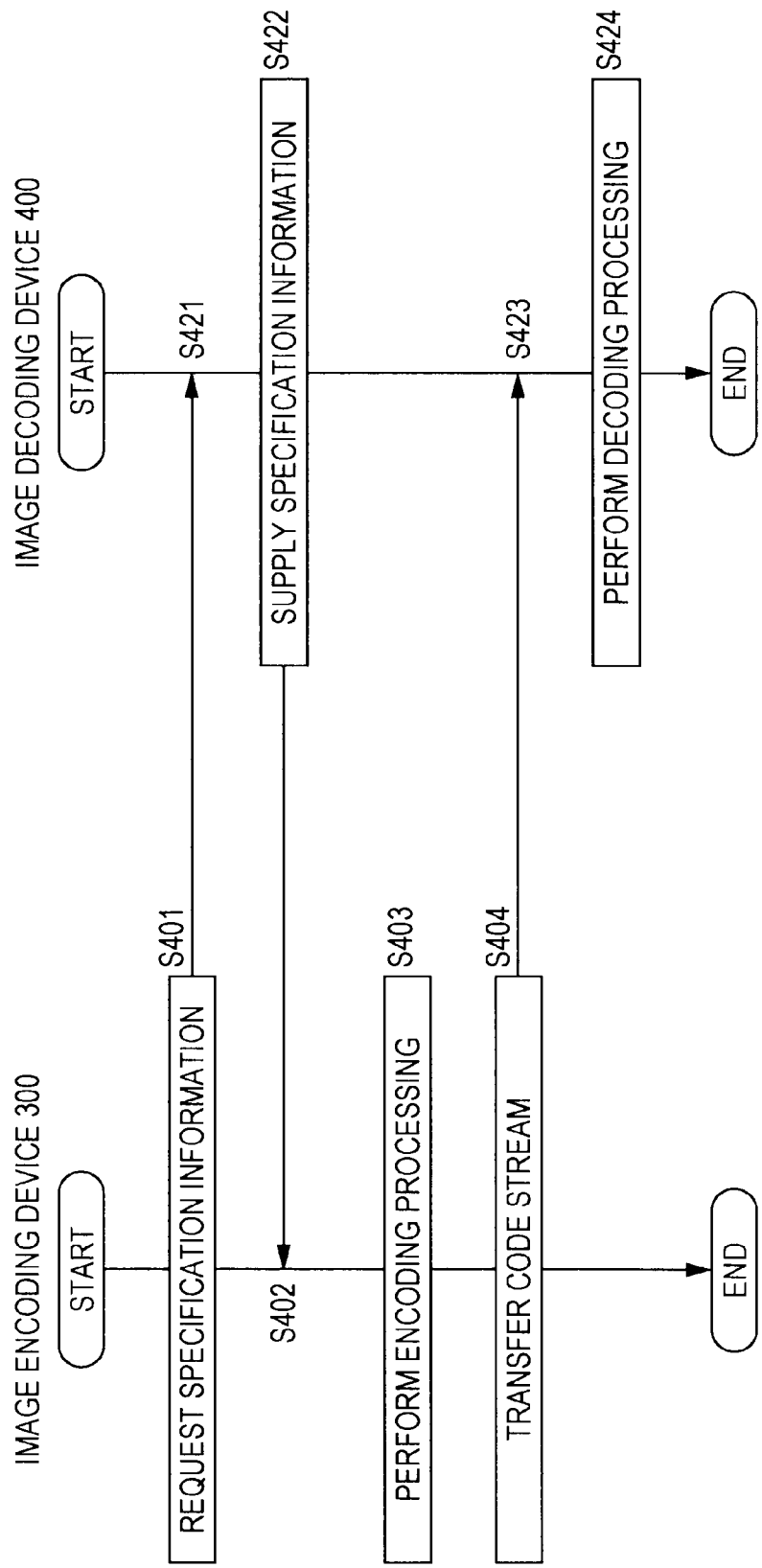
FIG. 19 is a flowchart describing an example of the flow of processing for exchanging specification information.

An example of the flow of exchange of specification information with such an image processing system will be described with reference to the flowchart in FIG. 19.

In step S401, the information collecting unit 304 of the image encoding device 300 requests the image decoding device 400 for specification information of the image decoding device 400 via the communication unit 303. Upon receiving the request in step S421, the communication unit 403 of the image decoding device 400 supplies the request to the information providing unit 402.

In step S422, the information providing unit 402 supplies the specification information of the image decoding device 400 to the requesting image encoding device 300 via the communication unit 403, as a response to the request.

Upon obtaining the specification information in step S402 via the communication unit 303, the information collecting unit 304 of the image encoding device 300 supplies this to the system specification managing unit 141 of the control information generating unit 112.

In step S403, the image encoding unit 301 performs encoding processing based on the specification information, and generates a code stream. In step S404, the image encoding unit 301 supplies the generated code stream to the image decoding device 400.

In step S423, the image decoding unit 401 of the image decoding device 400 obtains the code stream supplied from the image encoding device 300. In step S424, the image decoding unit 401 performs decoding processing as to the code stream.

Thus, specification information of the image decoding device 400 is exchanged before image encoding processing and image decoding processing, so the image encoding device 300 can create boundary control flags based on the system specification information including the specification information of the image decoding device 400.

Accordingly, the image encoding device 300 and the image decoding device 400 can suppress deterioration in the effects of filter processing due to local control of filter processing performed when encoding or decoding, as described with the first embodiment and second embodiment.

4. Fourth Embodiment

Description of QALF

ALF blocks may have a quad tree structure, as described with NPL 3. This technique is called QALF (Quad tree-based Adaptive Loop Filter). A quad tree structure is a hierarchical structure where, at a lower hierarchical level, the region of one ALF block one hierarchical level above is divided into four.

Figure 20:
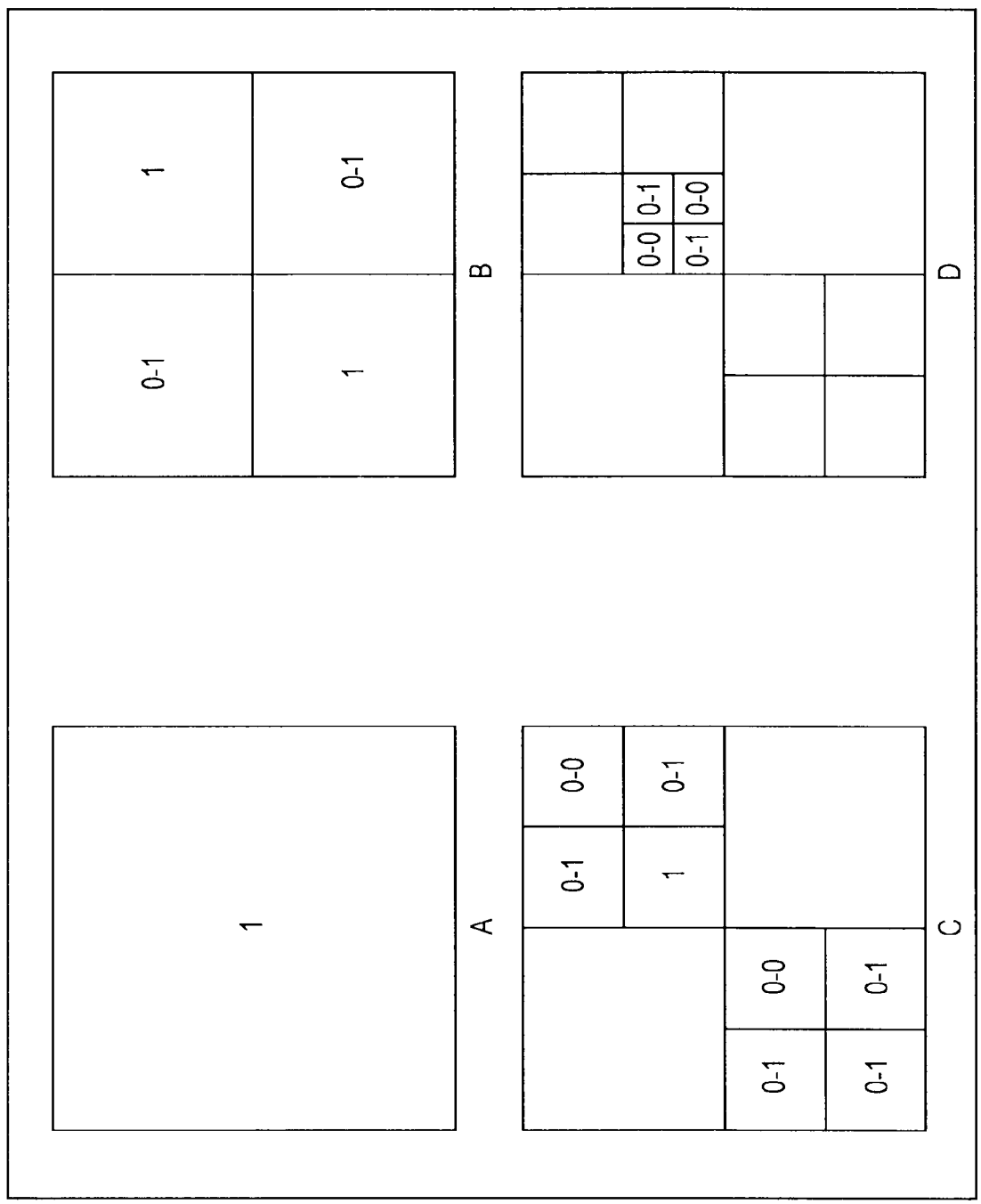
FIG. 20 is a diagram describing another example of ALF blocks and filter block flags.

FIG. 20 illustrates an example where ALF block division is expressed by a quad tree structure where the maximum number of layers is three, with a filter block flag being specified for each ALF block.

A in FIG. 20 indicates a layer 0 which is an ALF block serving as the root of the quad tree structure. In the quad tree structure, each ALF block has a block partitioning flag indicating whether or not it is divided into four at the lower hierarchical level. The value of the block partitioning flag of the ALF block shown in A in FIG. 20 is "1". That is to say, this ALF block is divided into four in the lower hierarchical level (layer 1). B in FIG. 20 shows the layer 1. That is to say, four ALF blocks are formed in the layer 1.

In the event that the block partitioning flag is "0", a further lower hierarchical level is not divided into four. That is to say, there is no further division, and a filter block flag is generated as to that ALF block. That is to say, an ALF block of which the block partitioning flag is "0" also has a filter block flag. The "0" to the left of the "0-1" shown in B in FIG. 20 indicates the block partitioning flag of that ALF block, and the "1" to the right shows the filter block flag of that ALF block.

The two ALF blocks of which the block partitioning flag in layer 1 is "1" are divided into four in the lower hierarchical level (layer 2). C in FIG. 20 illustrates the layer 2. That is to say, ten ALF blocks are formed in layer 2.

In the same way, ALF blocks with the block partitioning flag of "0" in layer 2 are also assigned a filter block flag. In C in FIG. 20, the block partitioning flag of one ALF block is "1".

That is to say, that ALF block is divided into four in the further lower hierarchical level (layer 3). D in FIG. 20 show the layer 3. That is to say, 13 ALF blocks are formed in the layer 3.

Figure 21:
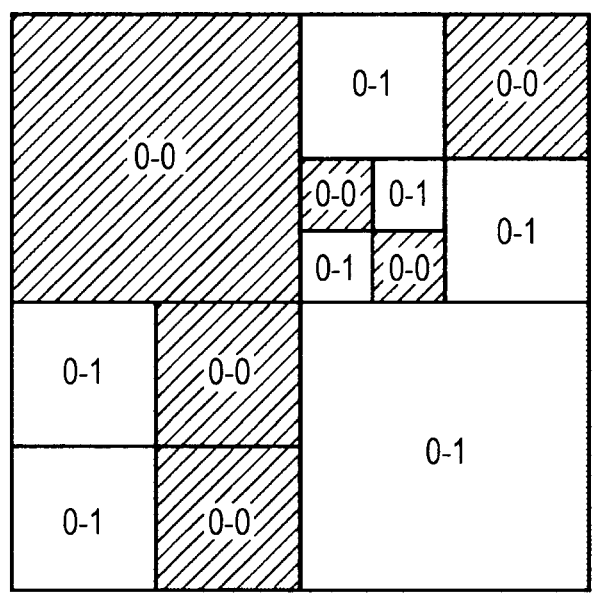
FIG. 21 is a diagram describing another example of ALF blocks and filter block flags.

By forming a quad tree as shown in FIG. 20, the structure of the ALF block ultimately becomes as shown in FIG. 21. Thus, with a quad tree structure, the size of ALF blocks differs with each hierarchical level. That is to say, by using a quad tree structure, the sizes of the ALF blocks can be made to be different one from another within the frame.

Control of the filter block flag in each ALF block is the same as with the other embodiments described above. That is to say, filter processing is not performed in regions where the value of the filter block flag is "0" (the hatched portions in FIG. 21).

Figure 22:
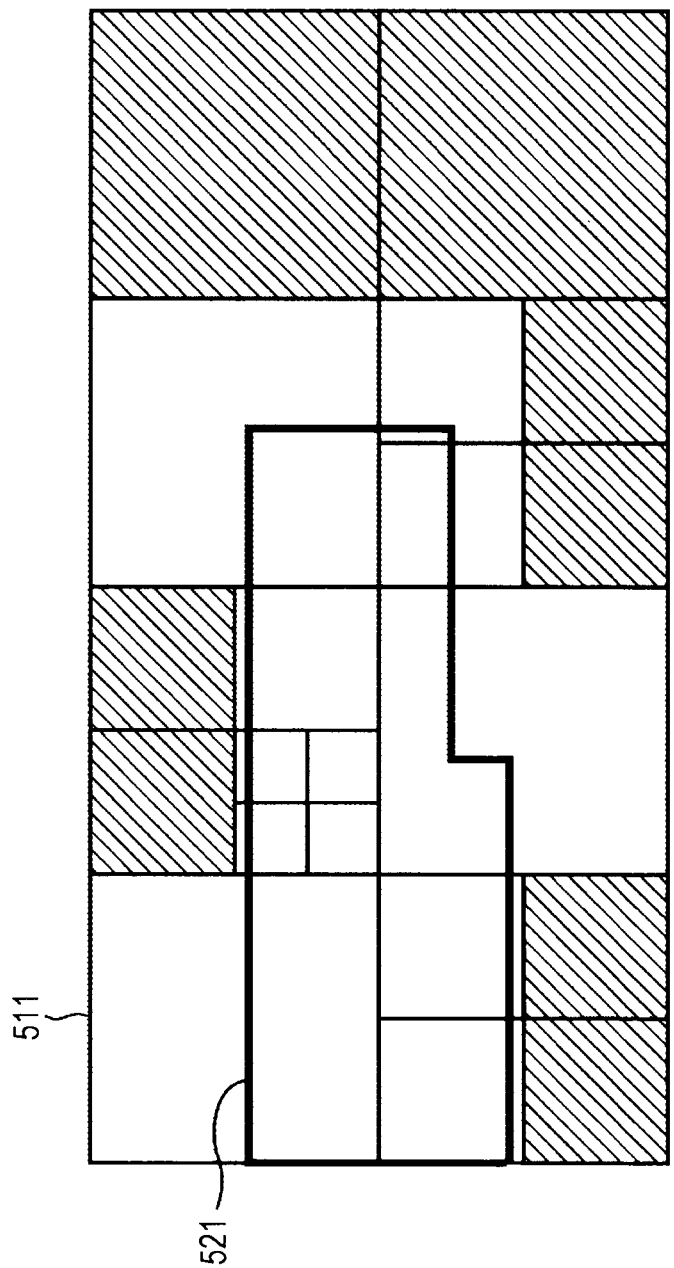
FIG. 22 is a diagram describing the way of processing is performed in the case of multi-slice.

FIG. 22 illustrates an example of encoding the region of slice 1 in FIG. 5 using the QALF technique. Here, the region of the heavy line 521 represents the region of slice 1. Regardless of the ALF structure, there may be cases where the surrounding pixels straddle multiple slices when performing filter processing on pixels near a slice boundary. Accordingly, the control method of filter processing as to pixels near a slice boundary can be performed in the same way as with the above-described embodiments for the case of QALF as well.

That is to say, even with a case of quad tree structure ALF blocks, the image encoding device and image decoding device can suppress deterioration in the effects of filter processing due to local control of filter processing performed when encoding or decoding.

5. Fifth Embodiment

Personal Computer

The above-described series of processing may be executed by hardware, and may be executed by software. In this case, a configuration may be made as a personal computer such as shown in FIG. 23, for example.

Figure 23:
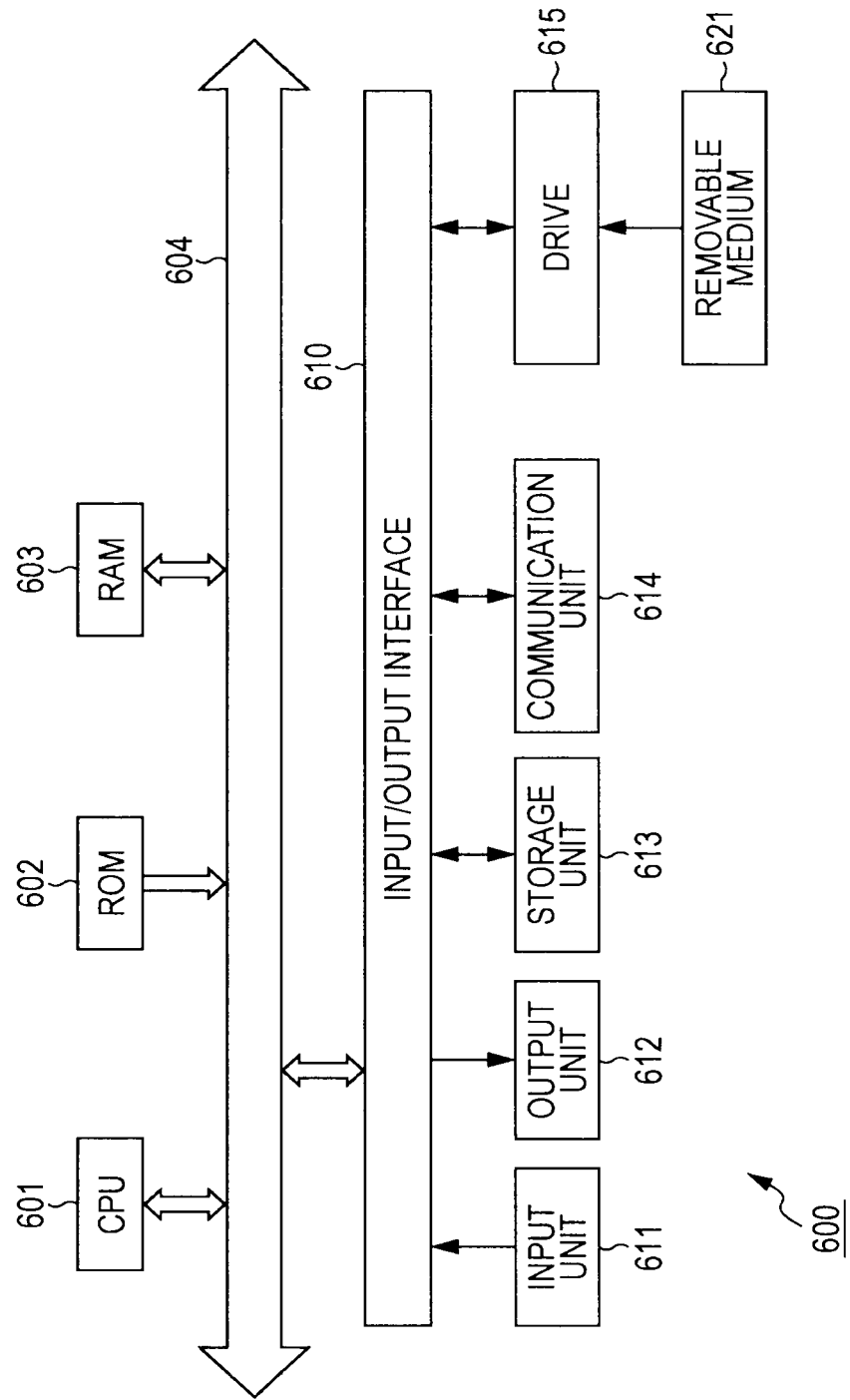
FIG. 23 is a block diagram illustrating a primary configuration example of a personal computer to which the present invention has been applied.

In FIG. 23, a CPU 601 of a personal computer 600 executes various types of processing following programs stored in ROM (Read Only Memory) 602 or programs loaded to RAM (Random Access Memory) 603 from a storage unit 613. The RAM 603 also stores data and so forth necessary for the CPU 601 to execute various types of processing, as appropriate.

The CPU 601, ROM 602, and RAM 603 are mutually connected by a bus 604. This bus 604 is also connected to an input/output interface 610.

Connected to the input/output interface 610 is an input unit 611 made up of a keyboard, a mouse, and so forth, an output unit 612 made up of a display such as a CRT (Cathode Ray Tube) or LCD (Liquid Crystal Display) or the like, a speaker, and so forth, a storage unit 613 made up of a hard disk and so forth, and a communication unit 614 made up of a modem and so forth. The communication unit 614 performs communication processing via networks including the Internet.

Also connected to the input/output interface 610 is a drive 615 as necessary, to which a removable medium 621 such as a magnetic disk, an optical disc, a magneto-optical disk, semiconductor memory, or the like, is mounted as appropriate, and computer programs read out therefrom are installed in the storage unit 613 as necessary.

In the event of executing the above-described series of processing by software, a program configuring the software is installed from a network or recording medium.

This recording medium is not only configured of a removable medium 621 made up of a magnetic disk (including flexible disk), optical disc (including CD-ROM (Compact Disc-Read Only Memory), DVD (Digital Versatile Disc), magneto-optical disc (MD (Mini Disc)), or semiconductor memory or the like, in which programs are recorded and distributed so as to distribute programs to users separately from the device main unit, but also is configured of ROM 602, a hard disk included in the storage unit 613, and so forth, in which programs are recorded, distributed to users in a state of having been built into the device main unit beforehand.

Note that a program which the computer executes may be a program in which processing is performed in time sequence following the order described in the present Specification, or may be a program in which processing is performed in parallel, or at a necessary timing, such as when a call-up has been performed.

Also, with the present Specification, steps describing programs recorded in the recording medium includes processing performed in time sequence following the described order as a matter of course, and also processing executed in parallel or individually, without necessarily being processed in time sequence.

Also, with the present specification, the term system represents the entirety of devices configured of multiple devices (devices).

Also, a configuration which has been described above as one device (or processing unit) may be divided and configured as multiple devices (or processing units). Conversely, configurations which have been described above as multiple devices (or processing units) may be integrated and configured as a single device (or processing unit). Also, configurations other than those described above may be added to the devices (or processing units), as a matter of course. Further, part of a configuration of a certain device (or processing unit) may be included in a configuration of another device (or another processing unit), as long as the configuration and operations of the overall system is substantially the same. That is to say, the embodiments of the present invention are not restricted to the above-described embodiments, and that various modifications may be made without departing from the essence of the present invention.

For example, the above-described image encoding device 100, image decoding device 200, encoding device 300, and image decoding device 400 may be applied to image various electronic devices. The following is a description of examples thereof.

6. Sixth Embodiment

Television Receiver

Figure 24:
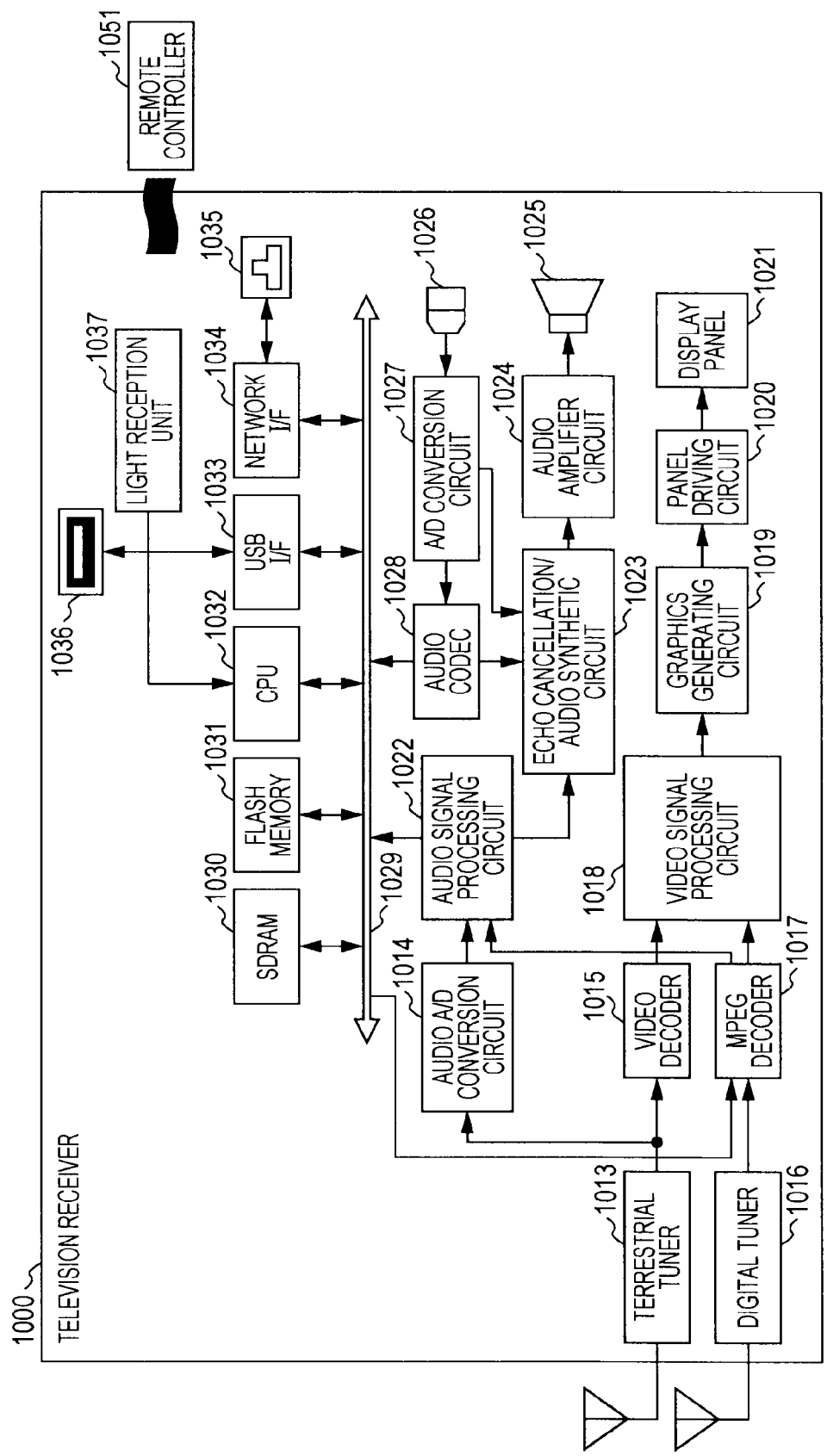
FIG. 24 is a block diagram illustrating a principal configuration example of a television receiver to which the present invention has been applied.

FIG. 24 is a block diagram illustrating a principal configuration example of a television receiver using the image decoding device 200 or image decoding device 400 to which the present invention has been applied.

A television receiver 1000 shown in FIG. 24 includes a terrestrial tuner 1013, a video decoder 1015, a video signal processing circuit 1018, a graphics generating circuit 1019, a panel driving circuit 1020, and a display panel 1021.

The terrestrial tuner 1013 receives the broadcast wave signals of a terrestrial analog broadcast via an antenna, demodulates, obtains video signals, and supplies these to the video decoder 1015. The video decoder 1015 subjects the video signals supplied from the terrestrial tuner 1013 to decoding processing, and supplies the obtained digital component signals to the video signal processing circuit 1018.

The video signal processing circuit 1018 subjects the video data supplied from the video decoder 1015 to predetermined processing such as noise removal or the like, and supplies the obtained video data to the graphics generating circuit 1019.

The graphics generating circuit 1019 generates the video data of a program to be displayed on a display panel 1021, or image data due to processing based on an application to be supplied via a network, or the like, and supplies the generated video data or image data to the panel driving circuit 1020. Also, the graphics generating circuit 1019 also performs processing such as supplying video data obtained by generating video data (graphics) for the user displaying a screen used for selection of an item or the like, and superimposing this on the video data of a program, to the panel driving circuit 1020 as appropriate.

The panel driving circuit 1020 drives the display panel 1021 based on the data supplied from the graphics generating circuit 1019 to display the video of a program, or the above-mentioned various screens on the display panel 1021.

The display panel 1021 is made up of an LCD (Liquid Crystal Display) and so forth, and displays the video of a program or the like in accordance with the control by the panel driving circuit 1020.

Also, the television receiver 1000 also includes an audio A/D (Analog/Digital) conversion circuit 1014, an audio signal processing circuit 1022, an echo cancellation/audio synthesizing circuit 1023, an audio amplifier circuit 1024, and a speaker 1025.

The terrestrial tuner 1013 demodulates the received broadcast wave signal, thereby obtaining not only a video signal but also an audio signal. The terrestrial tuner 1013 supplies the obtained audio signal to the audio A/D conversion circuit 1014.

The audio A/D conversion circuit 1014 subjects the audio signal supplied from the terrestrial tuner 1013 to A/D conversion processing, and supplies the obtained digital audio signal to the audio signal processing circuit 1022.

The audio signal processing circuit 1022 subjects the audio data supplied from the audio A/D conversion circuit 1014 to predetermined processing such as noise removal or the like, and supplies the obtained audio data to the echo cancellation/audio synthesizing circuit 1023.

The echo cancellation/audio synthesizing circuit 1023 supplies the audio data supplied from the audio signal processing circuit 1022 to the audio amplifier circuit 1024.

The audio amplifier circuit 1024 subjects the audio data supplied from the echo cancellation/audio synthesizing circuit 1023 to D/A conversion processing, subjects to amplifier processing to adjust to predetermined volume, and then outputs the audio from the speaker 1025.

Further, the television receiver 1000 also includes a digital tuner 1016, and an MPEG decoder 1017.

The digital tuner 1016 receives the broadcast wave signals of a digital broadcast (terrestrial digital broadcast, BS (Broadcasting Satellite)/CS (Communications Satellite) digital broadcast) via the antenna, demodulates to obtain MPEG-TS (Moving Picture Experts Group-Transport Stream), and supplies this to the MPEG decoder 1017.

The MPEG decoder 1017 descrambles the scrambling given to the MPEG-TS supplied from the digital tuner 1016, and extracts a stream including the data of a program serving as a playback object (viewing object). The MPEG decoder 1017 decodes an audio packet making up the extracted stream, supplies the obtained audio data to the audio signal processing circuit 1022, and also decodes a video packet making up the stream, and supplies the obtained video data to the video signal processing circuit 1018. Also, the MPEG decoder 1017 supplies EPG (Electronic Program Guide) data extracted from the MPEG-TS to a CPU 1032 via an unshown path.

The television receiver 1000 uses the above-mentioned image decoding device 200 or image decoding device 400 as the MPEG decoder 1017 for decoding video packets in this way. Note that the MPEG-TS transmitted from the broadcasting station or the like has been encoded by the image encoding device 100 or image encoding device 300.

The MPEG decoder 1017 extracts and decodes control information supplied from the image encoding device 100 or image encoding device 300, in the same way as with the image decoding device 200 or image decoding device 400, and performs adaptive filter control processing (and filter processing) using this control information. Accordingly, the MPEG decoder 1017 can suppress deterioration in the effects of local control of filter processing.

The video data supplied from the MPEG decoder 1017 is, in the same way as with the case of the video data supplied from the video decoder 1015, subjected to predetermined processing at the video signal processing circuit 1018, superimposed on the generated video data and so forth at the graphics generating circuit 1019 as appropriate, supplied to the display panel 1021 via the panel driving circuit 1020, and the image thereof is displayed thereon.

The audio data supplied from the MPEG decoder 1017 is, in the same way as with the case of the audio data supplied from the audio A/D conversion circuit 1014, subjected to predetermined processing at the audio signal processing circuit 1022, supplied to the audio amplifier circuit 1024 via the echo cancellation/audio synthesizing circuit 1023, and subjected to D/A conversion processing and amplifier processing. As a result thereof, the audio adjusted in predetermined volume is output from the speaker 1025.

Also, the television receiver 1000 also includes a microphone 1026, and an A/D conversion circuit 1027.

The A/D conversion circuit 1027 receives the user's audio signals collected by the microphone 1026 provided to the television receiver 1000 serving as for audio conversation, subjects the received audio signal to A/D conversion processing, and supplies the obtained digital audio data to the echo cancellation/audio synthesizing circuit 1023.

In the event that the user (user A)'s audio data of the television receiver 1000 has been supplied from the A/D conversion circuit 1027, the echo cancellation/audio synthesizing circuit 1023 perform echo cancellation with the user (user A)'s audio data taken as a object, and outputs audio data obtained by synthesizing the user A's audio data and other audio data, or the like from the speaker 1025 via the audio amplifier circuit 1024.

Further, the television receiver 1000 also includes an audio codec 1028, an internal bus 1029, SDRAM (Synchronous Dynamic Random Access Memory) 1030, flash memory 1031, a CPU 1032, a USB (Universal Serial Bus) I/F 1033, and a network I/F 1034.

The A/D conversion circuit 1027 receives the user's audio signal collected by the microphone 1026 provided to the television receiver 1000 serving as for audio conversation, subjects the received audio signal to A/D conversion processing, and supplies the obtained digital audio data to the audio codec 1028.

The audio codec 1028 converts the audio data supplied from the A/D conversion circuit 1027 into the data of a predetermined format for transmission via a network, and supplies to the network I/F 1034 via the internal bus 1029.

The network I/F 1034 is connected to the network via a cable mounted on a network terminal 1035. The network I/F 1034 transmits the audio data supplied from the audio codec 1028 to another device connected to the network thereof, for example. Also, the network I/F 1034 receives, via the network terminal 1035, the audio data transmitted from another device connected thereto via the network, and supplies this to the audio codec 1028 via the internal bus 1029, for example.

The audio codec 1028 converts the audio data supplied from the network I/F 1034 into the data of a predetermined format, and supplies this to the echo cancellation/audio synthesizing circuit 1023.

The echo cancellation/audio synthesizing circuit 1023 performs echo cancellation with the audio data supplied from the audio codec 1028 taken as an object, and outputs the data of audio obtained by synthesizing the audio data and other audio data, or the like, from the speaker 1025 via the audio amplifier circuit 1024.

The SDRAM 1030 stores various types of data necessary for the CPU 1032 performing processing.

The flash memory 1031 stores a program to be executed by the CPU 1032. The program stored in the flash memory 1031 is read out by the CPU 1032 at predetermined timing such as when activating the television receiver 1000, or the like. EPG data obtained via a digital broadcast, data obtained from a predetermined server via the network, and so forth are also stored in the flash memory 1031.

For example, MPEG-TS including the content data obtained from a predetermined server via the network by the control of the CPU 1032 is stored in the flash memory 1031. The flash memory 1031 supplies the MPEG-TS thereof to the MPEG decoder 1017 via the internal bus 1029 by the control of the CPU 1032, for example.

The MPEG decoder 1017 processes the MPEG-TS thereof in the same way as with the case of the MPEG-TS supplied from the digital tuner 1016. In this way, the television receiver 1000 receives the content data made up of video, audio, and so forth via the network, decodes using the MPEG decoder 1017, whereby video thereof can be displayed, and audio thereof can be output.

Also, the television receiver 1000 also includes a light reception unit 1037 for receiving the infrared signal transmitted from a remote controller 1051.

The light reception unit 1037 receives infrared rays from the remote controller 1051, and outputs a control code representing the content of the user's operation obtained by demodulation, to the CPU 1032.

The CPU 1032 executes the program stored in the flash memory 1031 to control the entire operation of the television receiver 1000 according to the control code supplied from the light reception unit 1037, and so forth. The CPU 1032, and the units of the television receiver 1000 are connected via an unshown path.

The USB I/F 1033 performs transmission/reception of data as to an external device of the television receiver 1000 which is connected via a USB cable mounted on a USB terminal 1036. The network I/F 1034 connects to the network via a cable mounted on the network terminal 1035, also performs transmission/reception of data other than audio data as to various devices connected to the network.

The television receiver 1000 uses the image decoding device 200 or image decoding device 400 as the MPEG decoder 1017, whereby deterioration in the effects of local control of filter processing as to broadcast signals received via an antenna or content data obtained via a network can be suppressed.

7. Seventh Embodiment

Cellular Telephone

Figure 25:
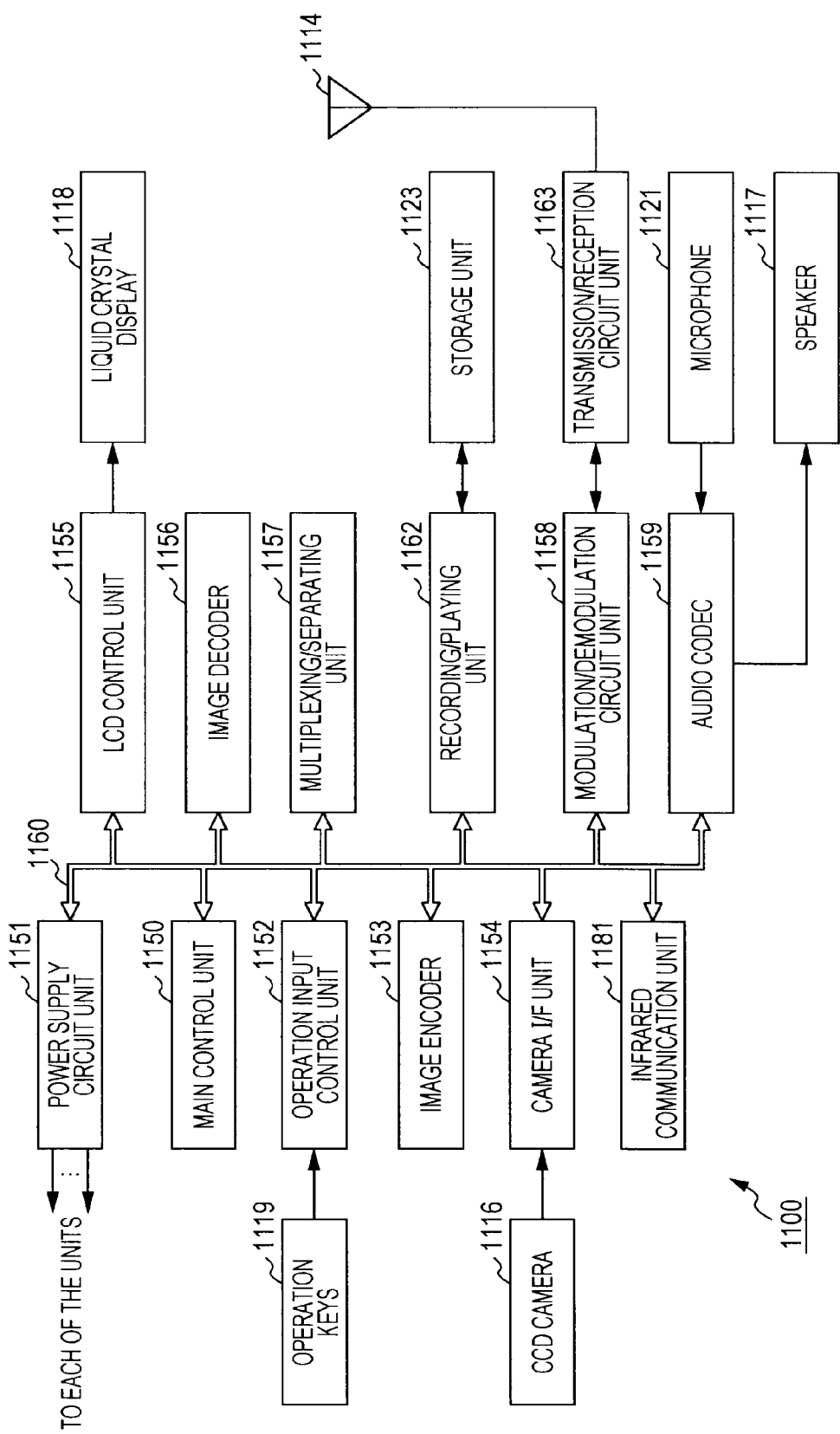
FIG. 25 is a block diagram illustrating a principal configuration example of a cellular telephone to which the present invention has been applied.

FIG. 25 is a block diagram illustrating a principal configuration example of a cellular telephone using the image encoding device and image decoding device to which the present invention has been applied.

A cellular telephone 1100 shown in FIG. 25 includes a main control unit 1150 configured so as to integrally control the units, a power supply circuit unit 1151, an operation input control unit 1152, an image encoder 1153, a camera I/F unit 1154, an LCD control unit 1155, an image decoder 1156, a multiplexing/separating unit 1157, a recording/playback unit 1162, a modulation/demodulation circuit unit 1158, and an audio codec 1159. These are mutually connected via a bus 1160.

Also, the cellular telephone 1100 includes operation keys 1119, a CCD (Charge Coupled Devices) camera 1116, a liquid crystal display 1118, a storage unit 1123, a transmission/reception circuit unit 1163, an antenna 1114, a microphone (MIC) 1121, and a speaker 1117.

Upon a call end and power key being turned on by the user's operation, the power supply circuit unit 1151 activates the cellular telephone 1100 in an operational state by supplying power to the units from a battery pack.

The cellular telephone 1100 performs various operations, such as transmission/reception of an audio signal, transmission/reception of an e-mail and image data, image shooting, data recoding, and so forth, in various modes such as a voice call mode, a data communication mode, and so forth, based on the control of the main control unit 1150 made up of a CPU, ROM, RAM, and so forth.

For example, in the voice call mode, the cellular telephone 1100 converts the audio signal collected by the microphone (mike) 1121 into digital audio data by the audio codec 1159, subjects this to spectrum spread processing at the modulation/demodulation circuit unit 1158, and subjects this to digital/analog conversion processing and frequency conversion processing at the transmission/reception circuit unit 1163. The cellular telephone 1100 transmits the signal for transmission obtained by the conversion processing thereof to an unshown base station via the antenna 1114. The signal for transmission (audio signal) transmitted to the base station is supplied to the cellular telephone of the other party via the public telephone network.

Also, for example, in the voice call mode, the cellular telephone 1100 amplifies the reception signal received at the antenna 1114, at the transmission/reception circuit unit 1163, further subjects to frequency conversion processing and analog/digital conversion processing, subjects to spectrum inverse spread processing at the modulation/demodulation circuit unit 1158, and converts into an analog audio signal by the audio codec 1159. The cellular telephone 1100 outputs the converted and obtained analog audio signal thereof from the speaker 1117.

Further, for example, in the event of transmitting an e-mail in the data communication mode, the cellular telephone 1100 accepts the text data of the e-mail input by the operation of the operation keys 1119 at the operation input control unit 1152. The cellular telephone 1100 processes the text data thereof at the main control unit 1150, and displays on the liquid crystal display 1118 via the LCD control unit 1155 as an image.

Also, the cellular telephone 1100 generates e-mail data at the main control unit 1150 based on the text data accepted by the operation input control unit 1152, the user's instructions, and so forth. The cellular telephone 1100 subjects the e-mail data thereof to spectrum spread processing at the modulation/demodulation circuit unit 1158, and subjects to digital/analog conversion processing and frequency conversion processing at the transmission/reception circuit unit 1163. The cellular telephone 1100 transmits the signal for transmission obtained by the conversion processing thereof to an unshown base station via the antenna 1114. The signal for transmission (e-mail) transmitted to the base station is supplied to a predetermined destination via the network, mail server, and so forth.

Also, for example, in the event of receiving an e-mail in the data communication mode, the cellular telephone 1100 receives the signal transmitted from the base station via the antenna 1114 with the transmission/reception circuit unit 1163, amplifies, and further subjects to frequency conversion processing and analog/digital conversion processing. The cellular telephone 1100 subjects the reception signal thereof to spectrum inverse spread processing at the modulation/demodulation circuit unit 1158 to restore the original e-mail data. The cellular telephone 1100 displays the restored e-mail data on the liquid crystal display 1118 via the LCD control unit 1155.

Note that the cellular telephone 1100 may record (store) the received e-mail data in the storage unit 1123 via the recording/playback unit 1162.

This storage unit 1123 is an optional rewritable recording medium. The storage unit 1123 may be semiconductor memory such as RAM, built-in flash memory, or the like, may be a hard disk, or may be a removable medium such as a magnetic disk, a magneto-optical disk, an optical disc, USB memory, a memory card, or the like. It goes without saying that the storage unit 1123 may be other than these.

Further, for example, in the event of transmitting image data in the data communication mode, the cellular telephone 1100 generates image data by imaging at the CCD camera 1116. The CCD camera 1116 includes a CCD serving as an optical device such as a lens, diaphragm, and so forth, and serving as a photoelectric conversion device, which images a subject, converts the intensity of received light into an electrical signal, and generates the image data of an image of the subject. The CCD camera 1116 performs compression encoding of the image data at the image encoder 1153 via the camera I/F unit 1154, and converts into encoded image data.

The cellular telephone 1100 employs the above-mentioned image encoding device 100 or image encoding device 300 as the image encoder 1153 for performing such processing. Accordingly, in the same way as with the image encoding device 100 or image encoding device 300, the image encoder 1053 can suppress deterioration of effects due to local control of filter processing.

Note that, at this time simultaneously, the cellular telephone 1100 converts the audio collected at the microphone (mike) 1121, while shooting with the CCD camera 1116, from analog to digital at the audio codec 1159, and further encodes this.

The cellular telephone 1100 multiplexes the encoded image data supplied from the image encoder 1153, and the digital audio data supplied from the audio codec 1159 at the multiplexing/separating unit 1157 using a predetermined method. The cellular telephone 1100 subjects the multiplexed data obtained as a result thereof to spectrum spread processing at the modulation/demodulation circuit unit 1158, and subjects to digital/analog conversion processing and frequency conversion processing at the transmission/reception circuit unit 1163. The cellular telephone 1100 transmits the signal for transmission obtained by the conversion processing thereof to an unshown base station via the antenna 1114. The signal for transmission (image data) transmitted to the base station is supplied to the other party via the network or the like.

Note that in the event that image data is not transmitted, the cellular telephone 1100 may also display the image data generated at the CCD camera 1116 on the liquid crystal display 1118 via the LCD control unit 1155 instead of the image encoder 1153.

Also, for example, in the event of receiving the data of a moving image file linked to a simple website or the like in the data communication mode, the cellular telephone 1100 receives the signal transmitted from the base station at the transmission/reception circuit unit 1163 via the antenna 1114, amplifies, and further subjects to frequency conversion processing and analog/digital conversion processing. The cellular telephone 1100 subjects the received signal to spectrum inverse spread processing at the modulation/demodulation circuit unit 1158 to restore the original multiplexed data. The cellular telephone 1100 separates the multiplexed data thereof at the multiplexing/separating unit 1157 into encoded image data and audio data.

The cellular telephone 1100 decodes the encoded image data at the image decoder 1156 using the decoding format corresponding to a predetermined encoding format such as MPEG2, MPEG4, or the like, thereby generating playback moving image data, and displays this on the liquid crystal display 1118 via the LCD control unit 1155. Thus, moving image data included in a moving image file linked to a simple website is displayed on the liquid crystal display 1118, for example.

The cellular telephone 1100 employs the above-mentioned image decoding device 200 or image decoding device 400 as the image decoder 1156 for performing such processing. Accordingly, in the same way as with the image decoding device 200 or image decoding device 400, the image decoder 1156 extracts and decodes control information supplied from the image encoding device 100 or image encoding device 300, and performs adaptive filter control processing (and filtering processing) using the control information. Thus, the image decoder 1156 can suppress deterioration of effects due to local control of filter processing.

At this time, simultaneously, the cellular telephone 1100 converts the digital audio data into an analog audio signal at the audio codec 1159, and outputs this from the speaker 1117. Thus, audio data included in a moving image file linked to a simple website is played, for example.

Note that, in the same way as with the case of e-mail, the cellular telephone 1100 may record (store) the received data linked to a simple website or the like in the storage unit 1123 via the recording/playback unit 1162.

Also, the cellular telephone 1100 analyzes the imaged two-dimensional code obtained by the CCD camera 1116 at the main control unit 1150, whereby information recorded in the two-dimensional code can be obtained.

Further, the cellular telephone 1100 can communicate with an external device at the infrared communication unit 1181 using infrared rays.

The cellular telephone 1100 employs the image encoding device 100 or image encoding device 300 as the image encoder 1153, whereby suppression can be realized of deterioration of effects due to local control of filter processing regarding encoded data generated by encoding image data generated at the CCD camera 1116, for example.

For example, the cellular telephone 1100 can improve the image quality of filter processing results by performing filter processing straddling slices, and can supply encoded data with higher image quality to other cellular telephones. Also, for example, by performing filter processing closed at the current slice, the cellular telephone 1100 can perform filter processing with low delay, and can supply encoded data to other cellular telephones with lower delay.

Also, the cellular telephone 1100 employs the image decoding device 200 or image decoding device 400 as the image decoder 1156, whereby suppression can be realized of deterioration of effects due to local control of filter processing regarding data of a moving image file linked to at a simple website or the like, for example.

For example, the cellular telephone 1100 can improve the image quality of filter processing results by performing filter processing straddling slices, and can realize high image quality of decoded images. Also, for example, by performing filter processing closed at the current slice, the cellular telephone 1100 can perform filter processing with low delay, and can decode encoded data with lower delay.

Note that description has been made so far wherein the cellular telephone 1100 employs the CCD camera 1116, but the cellular telephone 1100 may employ an image sensor (CMOS image sensor) using CMOS (Complementary Metal Oxide Semiconductor) instead of this CCD camera 1116. In this case as well, the cellular telephone 1100 can image a subject and generate the image data of an image of the subject in the same way as with the case of employing the CCD camera 1116.

Also, description has been made so far regarding the cellular telephone 1100, but the image encoding device 100 and the image decoding device 200 may be applied to any kind of device in the same way as with the case of the cellular telephone 1100 as long as it is a device having the same imaging function and communication function as those of the cellular telephone 1100, for example, such as a PDA (Personal Digital Assistants), smart phone, UMPC (Ultra Mobile Personal Computer), net book, notebook-sized personal computer, or the like.

8. Eighth Embodiment

Hard Disk Recorder

Figure 26:
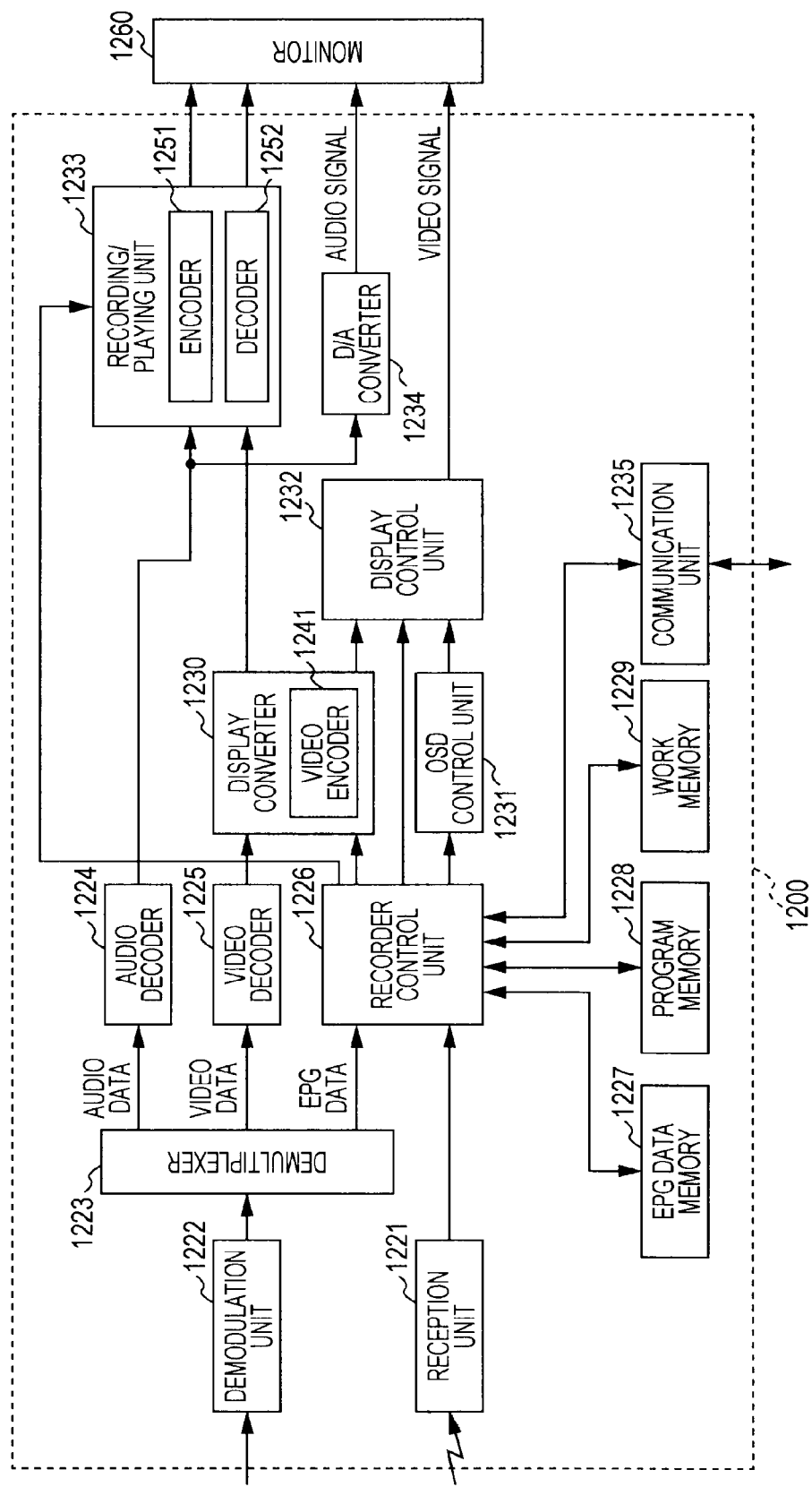
FIG. 26 is a block diagram illustrating a principal configuration example of a hard disk recorder to which the present invention has been applied.

FIG. 26 is a block diagram illustrating a principal configuration example of a hard disk recorder which employs the image encoding device and image decoding device to which the present invention has been applied.

A hard disk recorder (HDD recorder) 1200 shown in FIG. 26 is a device which stores, in a built-in hard disk, audio data and video data of a broadcast program included in broadcast wave signals (television signals) received by a tuner and transmitted from a satellite or a terrestrial antenna or the like, and provides the stored data to the user at timing according to the user's instructions.

The hard disk recorder 1200 can extract audio data and video data from broadcast wave signals, decode these as appropriate, and store in the built-in hard disk, for example. Also, the hard disk recorder 1200 can also obtain audio data and video data from another device via the network, decode these as appropriate, and store in the built-in hard disk, for example.

Further, the hard disk recorder 1200 can decode audio data and video data recorded in the built-in hard disk, supply this to a monitor 1260, display an image thereof on the screen of the monitor 1260, and output audio thereof from the speaker of the monitor 1260, for example. Also, the hard disk recorder 1200 can decode audio data and video data extracted from broadcast signals obtained via a tuner, or audio data and video data obtained from another device via a network, supply this to the monitor 1260, display an image thereof on the screen of the monitor 1260, and output audio thereof from the speaker of the monitor 1260, for example.

Of course, operations other than these may be performed.

As shown in FIG. 26, the hard disk recorder 1200 includes a reception unit 1221, a demodulation unit 1222, a demultiplexer 1223, an audio decoder 1224, a video decoder 1225, and a recorder control unit 1226. The hard disk recorder 1200 further includes EPG data memory 1227, program memory 1228, work memory 1229, a display converter 1230, an OSD (On Screen Display) control unit 1231, a display control unit 1232, a recording/playback unit 1233, a D/A converter 1234, and a communication unit 1235.

Also, the display converter 1230 includes a video encoder 1241. The recording/playback unit 1233 includes an encoder 1251 and a decoder 1252.

The reception unit 1221 receives the infrared signal from the remote controller (not shown), converts into an electrical signal, and outputs to the recorder control unit 1226. The recorder control unit 1226 is configured of, for example, a microprocessor and so forth, and executes various types of processing in accordance with the program stored in the program memory 1228. At this time, the recorder control unit 1226 uses the work memory 1229 according to need.

The communication unit 1235, which is connected to the network, performs communication processing with another device via the network. For example, the communication unit 1235 is controlled by the recorder control unit 1226 to communicate with a tuner (not shown), and to principally output a channel selection control signal to the tuner.

The demodulation unit 1222 demodulates the signal supplied from the tuner, and outputs to the demultiplexer 1223. The demultiplexer 1223 separates the data supplied from the demodulation unit 1222 into audio data, video data, and EPG data, and outputs to the audio decoder 1224, video decoder 1225, and recorder control unit 1226, respectively.

The audio decoder 1224 decodes the input audio data, and outputs to the recording/playback unit 1233. The video decoder 1225 decodes the input video data, and outputs to the display converter 1230. The recorder control unit 1226 supplies the input EPG data to the EPG data memory 1227 for storing.

The display converter 1230 encodes the video data supplied from the video decoder 1225 or recorder control unit 1226 into, for example, the video data conforming to the NTSC (National Television Standards Committee) format using the video encoder 1241, and outputs to the recording/playback unit 1233. Also, the display converter 1230 converts the size of the screen of the video data supplied from the video decoder 1225 or recorder control unit 1226 into the size corresponding to the size of the monitor 1260, converts the video data of which the screen size has been converted into the video data conforming to the NTSC format using the video encoder 1241, converts into an analog signal, and outputs to the display control unit 1232.

The display control unit 1232 superimposes, under the control of the recorder control unit 1226, the OSD signal output from the OSD (On Screen Display) control unit 1231 on the video signal input from the display converter 1230, and outputs to the display of the monitor 1260 for display.

Also, the audio data output from the audio decoder 1224 has been converted into an analog signal using the D/A converter 1234, and supplied to the monitor 1260. The monitor 1260 outputs this audio signal from a built-in speaker.

The recording/playback unit 1233 includes a hard disk as a recording medium in which video data, audio data, and so forth are recorded.

The recording/playback unit 1233 encodes the audio data supplied from the audio decoder 1224 by the encoder 1251. Also, the recording/playback unit 1233 encodes the video data supplied from the video encoder 1241 of the display converter 1230 by the encoder 1251. The recording/playback unit 1233 synthesizes the encoded data of the audio data thereof, and the encoded data of the video data thereof using the multiplexer. The recording/playback unit 1233 amplifies the synthesized data by channel coding, and writes the data thereof in the hard disk via a recording head.

The recording/playback unit 1233 plays the data recorded in the hard disk via a playback head, amplifies, and separates into audio data and video data using the demultiplexer. The recording/playback unit 1233 decodes the audio data and video data by the decoder 1252 using the MPEG format. The recording/playback unit 1233 converts the decoded audio data from digital to analog, and outputs to the speaker of the monitor 1260. Also, the recording/playback unit 1233 converts the decoded video data from digital to analog, and outputs to the display of the monitor 1260.

The recorder control unit 1226 reads out the latest EPG data from the EPG data memory 1227 based on the user's instructions indicated by the infrared signal from the remote controller which is received via the reception unit 1221, and supplies to the OSD control unit 1231. The OSD control unit 1231 generates image data corresponding to the input EPG data, and outputs to the display control unit 1232. The display control unit 1232 outputs the video data input from the OSD control unit 1231 to the display of the monitor 1260 for display. Thus, EPG (Electronic Program Guide) is displayed on the display of the monitor 1260.

Also, the hard disk recorder 1200 can obtain various types of data such as video data, audio data, EPG data, and so forth supplied from another device via the network such as the Internet or the like.

The communication unit 1235 is controlled by the recorder control unit 1226 to obtain encoded data such as video data, audio data, EPG data, and so forth transmitted from another device via the network, and to supply this to the recorder control unit 1226. The recorder control unit 1226 supplies the encoded data of the obtained video data and audio data to the recording/playback unit 1233, and stores in the hard disk, for example. At this time, the recorder control unit 1226 and recording/playback unit 1233 may perform processing such as re-encoding or the like according to need.

Also, the recorder control unit 1226 decodes the encoded data of the obtained video data and audio data, and supplies the obtained video data to the display converter 1230. The display converter 1230 processes, in the same way as the video data supplied from the video decoder 1225, the video data supplied from the recorder control unit 1226, supplies to the monitor 1260 via the display control unit 1232 for displaying an image thereof.

Alternatively, an arrangement may be made wherein in accordance with this image display, the recorder control unit 1226 supplies the decoded audio data to the monitor 1260 via the D/A converter 1234, and outputs audio thereof from the speaker.

Further, the recorder control unit 1226 decodes the encoded data of the obtained EPG data, and supplies the decoded EPG data to the EPG data memory 1227.

The hard disk recorder 1200 thus configured employs the image decoding device 200 or image decoding device 400 as the video decoder 1225, decoder 1252, and decoder housed in the recorder control unit 1226. Accordingly, in the same way as with the image decoding device 200 or image decoding device 400, the video decoder 1225, decoder 1252, and decoder housed in the recorder control unit 1226 extract and decode control information supplied from the image encoding device 100 or image encoding device 300, and perform adaptive filter control processing (and filter processing) using the control information. Accordingly, the video decoder 1225, decoder 1252, and decoder housed in the recorder control unit 1226 can suppress deterioration of effects due to local control of filter processing.

Accordingly, the hard disk recorder 1200 can suppress deterioration of effects due to local control of filter processing regarding video data received via the tuner or communication unit 1235, and video data recorded in the hard disk of the recording/playback unit 1233, for example.

For example, the hard disk recorder 1200 can improve the image quality of filter processing results by performing filter processing straddling slices, and can realize high image quality of decoded images. Also, for example, by performing filter processing closed at the current slice, the hard disk recorder 1200 can perform filter processing with low delay, and can decode encoded data with low delay.

Also, the hard disk recorder 1200 employs the image encoding device 100 or image encoding device 300 as the encoder 1251. Accordingly, in the same way as with the case of the image encoding device 100 or image encoding device 300, the encoder 1251 can realize suppression of deterioration of effects due to local control of filter processing.

Accordingly, the hard disk recorder 1200 can suppress deterioration of effects due to local control of filter processing regarding encoded data recorded in the hard disk, for example.

For example, the hard disk recorder 1200 can improve the image quality of filter processing results by performing filter processing straddling slices, and can record encoded data with higher image quality in the hard disk. Also, for example, by performing filter processing closed at the current slice, the hard disk recorder 1200 can perform filter processing with low delay, and can generate encoded data and record in the hard disk with lower delay.

Note that description has been made so far regarding the hard disk recorder 1200 for recording video data and audio data in the hard disk, but it goes without saying that any kind of recording medium may be employed. For example, even with a recorder to which a recording medium other than a hard disk, such as flash memory, optical disc, video tape, or the like, is applied, the image encoding device 100 and image decoding device 200 can be applied thereto in the same way as with the case of the above hard disk recorder 1200.

9. Ninth Embodiment

Camera

Figure 27:
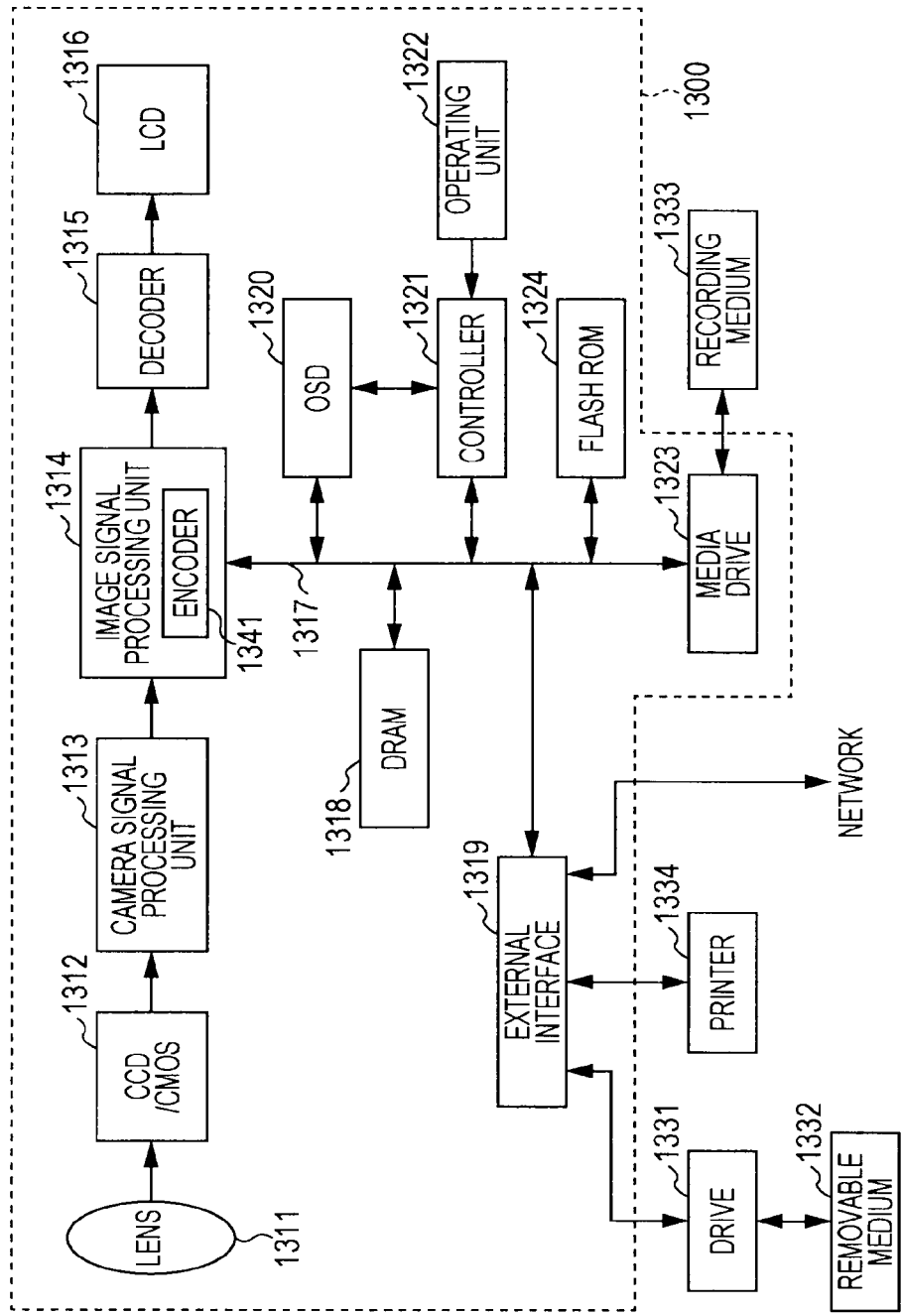
FIG. 27 is a block diagram illustrating a principal configuration example of a camera to which the present invention has been applied.

FIG. 27 is a block diagram illustrating a principal configuration example of a camera employing the image encoding device and image decoding device to which the present invention has been applied.

A camera 1300 shown in FIG. 27 images a subject, displays an image of the subject on an LCD 1316, and records this in a recording medium 1333 as image data.

A lens block 1311 inputs light (i.e., picture of a subject) to a CCD/CMOS 1312. The CCD/CMOS 1312 is an image sensor employing a CCD or CMOS, which converts the intensity of received light into an electrical signal, and supplies to a camera signal processing unit 1313.

The camera signal processing unit 1313 converts the electrical signal supplied from the CCD/CMOS 1312 into color difference signals of Y, Cr, and Cb, and supplies to an image signal processing unit 1314. The image signal processing unit 1314 subjects, under the control of a controller 1321, the image signal supplied from the camera signal processing unit 1313 to predetermined image processing, or encodes the image signal thereof by an encoder 1341 using the MPEG format for example. The image signal processing unit 1314 supplies encoded data generated by encoding an image signal, to a decoder 1315. Further, the image signal processing unit 1314 obtains data for display generated at an on-screen display (OSD) 1320, and supplies this to the decoder 1315.

With the above-mentioned processing, the camera signal processing unit 1313 appropriately takes advantage of DRAM (Dynamic Random Access Memory) 1318 connected via a bus 1317 to hold image data, encoded data encoded from the image data thereof, and so forth in the DRAM 1318 thereof according to need.

The decoder 1315 decodes the encoded data supplied from the image signal processing unit 1314, and supplies obtained image data (decoded image data) to the LCD 1316. Also, the decoder 1315 supplies the data for display supplied from the image signal processing unit 1314 to the LCD 1316. The LCD 1316 synthesizes the image of the decoded image data, and the image of the data for display, supplied from the decoder 1315 as appropriate, and displays a synthesizing image thereof.

The on-screen display 1320 outputs, under the control of the controller 1321, data for display such as a menu screen or icon or the like made up of a symbol, characters, or a figure to the image signal processing unit 1314 via the bus 1317.

Based on a signal indicating the content commanded by the user using an operating unit 1322, the controller 1321 executes various types of processing, and also controls the image signal processing unit 1314, DRAM 1318, external interface 1319, on-screen display 1320, media drive 1323, and so forth via the bus 1317. A program, data, and so forth necessary for the controller 1321 executing various types of processing are stored in FLASH ROM 1324.

For example, the controller 1321 can encode image data stored in the DRAM 1318, or decode encoded data stored in the DRAM 1318 instead of the image signal processing unit 1314 and decoder 1315. At this time, the controller 1321 may perform encoding and decoding processing using the same format as the encoding and decoding format of the image signal processing unit 1314 and decoder 1315, or may perform encoding and decoding processing using a format that neither the image signal processing unit 1314 nor the decoder 1315 can handle.

Also, for example, in the event that start of image printing has been instructed from the operating unit 1322, the controller 1321 reads out image data from the DRAM 1318, and supplies this to a printer 1334 connected to the external interface 1319 via the bus 1317 for printing.

Further, for example, in the event that image recording has been instructed from the operating unit 1322, the controller 1321 reads out encoded data from the DRAM 1318, and supplies this to a recording medium 1333 mounted on the media drive 1323 via the bus 1317 for storing.

The recording medium 1333 is an optional readable/writable removable medium, for example, such as a magnetic disk, a magneto-optical disk, an optical disc, semiconductor memory, or the like. It goes without saying that the recording medium 1333 is also optional regarding the type of a removable medium, and accordingly may be a tape device, or may be a disc, or may be a memory card. It goes without saying that the recoding medium 1333 may be a non-contact IC card or the like.

Alternatively, the media drive 1323 and the recording medium 1333 may be configured so as to be integrated into a non-transportability recording medium, for example, such as a built-in hard disk drive, SSD (Solid State Drive), or the like.

The external interface 1319 is configured of, for example, a USB input/output terminal and so forth, and is connected to the printer 1334 in the event of performing printing of an image. Also, a drive 1331 is connected to the external interface 1319 according to need, on which the removable medium 1332 such as a magnetic disk, optical disc, or magneto-optical disk is mounted as appropriate, and a computer program read out therefrom is installed in the FLASH ROM 1324 according to need.

Further, the external interface 1319 includes a network interface to be connected to a predetermined network such as a LAN, the Internet, or the like. For example, in accordance with the instructions from the operating unit 1322, the controller 1321 can read out encoded data from the DRAM 1318, and supply this from the external interface 1319 to another device connected via the network. Also, the controller 1321 can obtain, via the external interface 1319, encoded data or image data supplied from another device via the network, and hold this in the DRAM 1318, or supply this to the image signal processing unit 1314.

The camera 1300 thus configured employs the image decoding device 200 or image decoding device 400 as the decoder 1315. Accordingly, in the same way as with the image decoding device 200 or image decoding device 400, the decoder 1315 extracts and decodes control information supplied from the image encoding device 100 or image encoding device 300, and performs adaptive filter control processing (and filter processing) using the control information. Accordingly, the decoder 1315 can suppress deterioration of effects due to local control of filter processing.

Accordingly, the camera 1300 can suppress deterioration of effects due to local control of filter processing regarding, for example, from the image data generated at the CCD/CMOS 1312, the encoded data of video data read out from the DRAM 1318 or recording medium 1333, and encoded data of video data obtained via the network.

For example, the camera 1300 can improve the image quality of filter processing results by performing filter processing straddling slices, and can realize high image quality of decoded images. Also, for example, by performing filter processing closed at the current slice, the camera 1300 can perform filter processing with low delay, and can decode encoded data with low delay.

Also, the camera 1300 employs the image encoding device 100 or image encoding device 300 as the encoder 1341. Accordingly, in the same way as with the case of the image encoding device 100 or image encoding device 300, the encoder 1341 can realize suppression of deterioration of effects due to local control of filter processing.

Accordingly, the camera 1300 can suppress deterioration of effects due to local control of filter processing regarding the encoded data recorded in the DRAM 1318 or recording medium 1333, or encoded data to be provided to other devices, for example.

For example, the camera 1300 can improve the image quality of filter processing results by performing filter processing straddling slices, and can record encoded data with higher image quality in the DRAM 1318 or recording medium 1333, or provide this to other devices. Also, for example, by performing filter processing closed at the current slice, the camera 1300 can perform filter processing with low delay, and can generate encoded data and record in the in the DRAM 1318 or recording medium 1333, or provide this to other devices, with lower delay.

Note that the decoding method of the image decoding device 200 or image decoding device 400 may be applied to the decoding processing which the controller 1321 performs. In the same way, the encoding method of the image encoding device 100 or image encoding device 300 may be applied to the encoding processing which the controller 1321 performs.

Also, the image data which the camera 1300 takes may be moving images or may be still images.

As a matter of course, the image encoding device 100, image decoding device 200, image encoding device 300, and image decoding device 400 may be applied to devices or systems other than the above-described devices.

Figure 28:
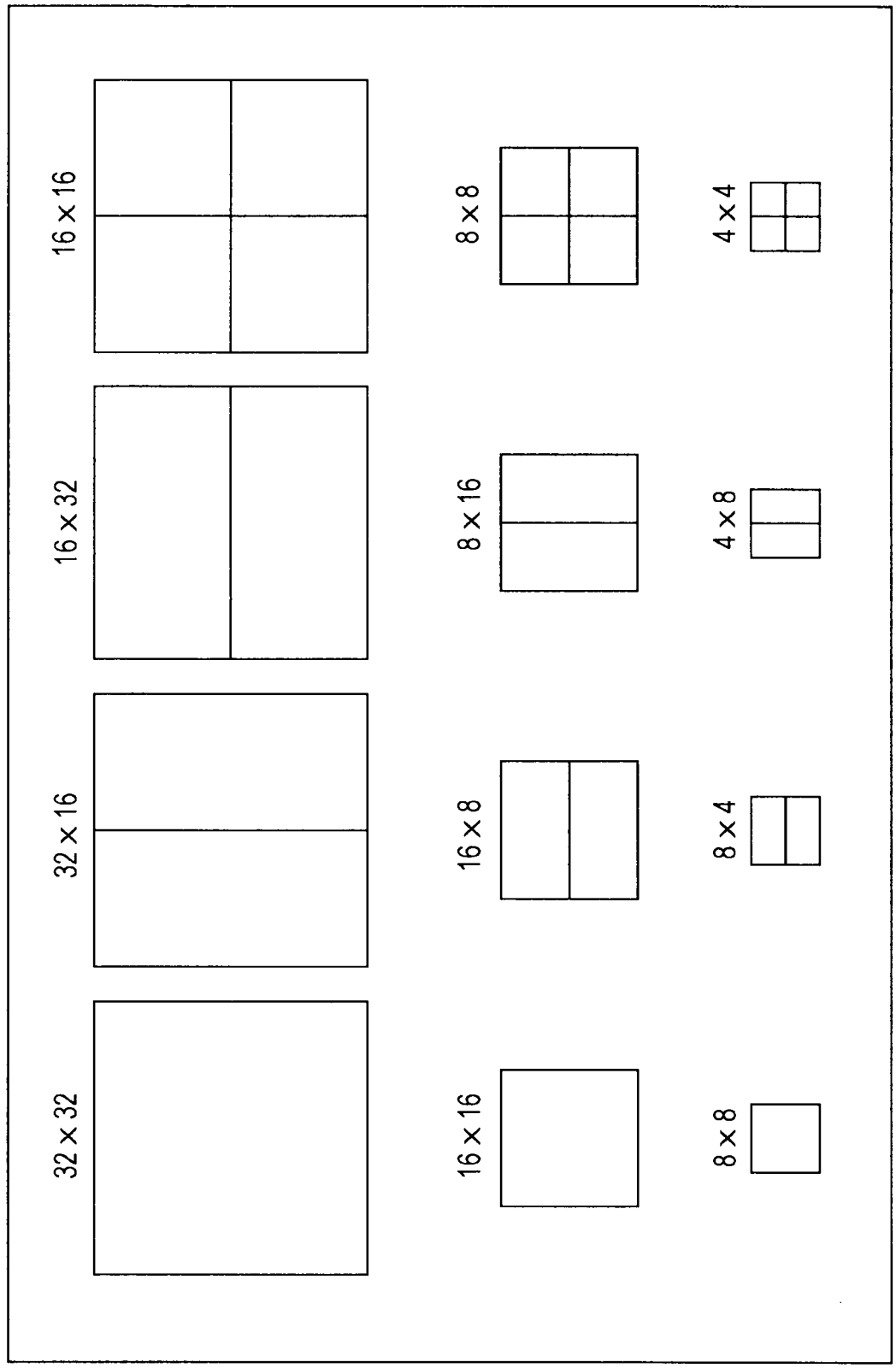
FIG. 28 is a diagram illustrating an example of macro blocks.

Also, the size of macroblocks is not restricted to 16×16 pixels. Application can be made to macroblocks of various sizes, such as that of 32×32 pixels shown in FIG. 28, for example.

While description has been made above with flag information and the like being multiplexed (described) in the bit stream, flags and image data (or bit stream) may be transmitted (recorded), for example, besides being multiplexed. A form may be made where the flag and image data (or bit stream) are linked (added) as well.

Linking (adding) indicates a state in which image data (or bit streams) and flags are mutually linked (a correlated state), and the physical positional relation is arbitrary. For example, the image data (or bit stream) and flags may be transmitted over separate transmission paths. Also, the image data (or bit stream) and flags may each be recorded in separate recording mediums (or in separate recording areas within the same recording medium). Note that the increments in which image data (or bit streams) and flags are linked are optional, and may be set in increments of encoding processing (one frame, multiple frames, etc.), for example.

REFERENCE SIGNS LIST

100 image encoding device
112 control information generating unit
113 adaptive filter control unit
132 boundary control flag generating unit
141 system specification managing unit
142 determining unit
161 pixel to be processed
162 surrounding pixels
163 slice boundary
171 control unit
172 adaptive filter
173 selecting unit
181 buffer
182 in-slice adaptive filter
183 first adaptive filter for boundary
184 second adaptive filter for boundary
200 image decoding device
202 lossless decoding unit
207 adaptive filter processing unit
300 image encoding device
301 image encoding unit
302 input unit
303 communication unit
304 information collection unit
400 image decoding unit
401 image decoding unit
402 information providing unit
403 communication unit

The invention claimed is:

1. An image encoding device comprising:
   an adaptive filter configured to perform an adaptive filtering process on an image block to be encoded;
   generating circuitry configured to generate filter block data for the image block for controlling whether or not to perform the adaptive filtering process on the image block, and to generate boundary control data for controlling whether or not a first pixel in a first slice of an image is required to perform the adaptive filtering process on a second pixel included in the image block in a second slice of the image; and
   encoder circuitry configured to encode the image block after the adaptive filter performs the adaptive filtering process when the filter block data indicates that the adaptive filtering process is to be performed,
   wherein the adaptive filter is configured to perform the adaptive filtering process on all pixels in the image block when the filter block data indicates that the adaptive filtering process is to be performed and the boundary control data indicates that the first pixel in the first slice of the image is required to perform the adaptive filtering process on the second pixel included in the image block in the second slice of the image.

2. The image encoding device according to claim 1, wherein the encoder circuitry encodes the boundary control data in a second slice header of the second slice of the image including the encoded image block.

3. The image encoding device according to claim 1, wherein the adaptive filter is configured to perform the adaptive filtering process on all pixels excluding boundary pixels in the image block when the filter block data indicates that the adaptive filtering process is to be performed and the boundary control data indicates that the first pixel in the first slice of the image is not required to perform the adaptive filtering process on the second pixel included in the image block in the second slice of the image.

4. The image encoding device according to claim 3, wherein the adaptive filter is configured to perform the adaptive filtering process on no pixel in the image block when the filter block data indicates that the adaptive filtering process is not to be performed and the boundary control data indicates that the first pixel in the first slice of the image is not required to perform the adaptive filtering process on the second pixel included in the image block in the second slice of the image.

5. The image encoding device according to claim 4, wherein the image block is divided into four portions in a lower hierarchical level, and the adaptive filter is configured to perform the adaptive filtering process on a divided portion of the image block based on the filter block data and the boundary control data.

6. The image encoding device according to claim 5, wherein the generating circuitry generates block size information, and the adaptive filter is configured to perform the adaptive filtering process on the image block based on a position of the image calculated using the block size information.

7. An image encoding method comprising:
   generating filter block data for an image block for controlling whether or not to perform an adaptive filtering process on the image block, and boundary control data for controlling whether or not a first pixel in a first slice of an image is required to perform the adaptive filtering process on a second pixel included in the image block in a second slice of the image;

performing the adaptive filtering process on the image block to be encoded in accordance with the filter block data; and encoding the image block after the performing the adaptive filtering process when the filter block data indicates that the adaptive filtering process is to be performed, wherein the adaptive filtering process is performed on all pixels in the image block when the filter block data indicates that the adaptive filtering process is to be performed and the boundary control data indicates that the first pixel in the first slice of the image is required to perform the adaptive filtering process on the second pixel included in the image block in the second slice of the image.

8. The image encoding method according to claim 7, wherein the boundary control data is included in a second slice header of the second slice of the image including the encoded image block.

9. The image encoding method according to claim 7, wherein the performing the adaptive filtering process includes performing the adaptive filtering process on all pixels excluding boundary pixels in the image block when the filter block data indicates that the adaptive filtering process is to be performed and the boundary control data indicates that the first pixel in the first slice of the image is not required to perform the adaptive filtering process on the second pixel included in the image block in the second slice of the image.

10. The image encoding method according to claim 9, wherein the performing the adaptive filtering process includes performing the adaptive filtering process on no pixel in the image block when the filter block data indicates that the adaptive filtering process is not to be performed and the boundary control data indicates that the first pixel in the first slice of the image is not required to perform the adaptive filtering process on the second pixel included in the image block in the second slice of the image.

11. The image encoding method according to claim 10, further comprising:
 dividing the image block into four portions in a lower hierarchical level; and
 performing the adaptive filtering process on a divided portion of the image block based on the filter block data and the boundary control data.

12. The image encoding method according to claim 11, further comprising:
 generating block size information; and
 performing the adaptive filtering process on the image block based on a position of the image calculated using the block size information.

13. A non-transitory computer readable medium encoded with a computer program that, when executed on a processor, causes the processor to perform the method according to claim 7.

* * * * *